(12) United States Patent
Rumpf et al.

(10) Patent No.: US 10,974,443 B2
(45) Date of Patent: Apr. 13, 2021

(54) 3D VOLUMETRIC CIRCUITS AND ASSOCIATED METHODS

(71) Applicant: Board of Regents, The University of Texas System, Austin, TX (US)

(72) Inventors: Raymond C. Rumpf, El Paso, TX (US); Cesar Luis Valle, El Paso, TX (US); Gilbert Carranza, El Paso, TX (US); Ubaldo Robles, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 16/678,557

(22) Filed: Nov. 8, 2019

(65) Prior Publication Data
US 2020/0254683 A1 Aug. 13, 2020

Related U.S. Application Data

(60) Provisional application No. 62/758,134, filed on Nov. 9, 2018.

(51) Int. Cl.
*B29C 64/118* (2017.01)
*B29C 64/393* (2017.01)
(Continued)

(52) U.S. Cl.
CPC .......... *B29C 64/118* (2017.08); *B29C 64/209* (2017.08); *B29C 64/393* (2017.08)

(58) Field of Classification Search
None
See application file for complete search history.

(56) References Cited

U.S. PATENT DOCUMENTS

| 2016/0198576 A1* | 7/2016 | Lewis | B29C 64/118 |
| | | | 361/761 |
| 2016/0236419 A1* | 8/2016 | Griffin | B29C 64/141 |
| 2018/0099461 A1* | 4/2018 | Matthews | B29C 64/112 |

OTHER PUBLICATIONS

Ketterl et al., "A 2.45 GHz Phased Array Antenna Unit Cell Fabricated Using 3-D Multi-Layer Direct Digital Manufacturing," IEEE Transactions on Microwave Theory and Techniques, vol. 63, No. 12, Dec. 2015, 13 pages.

(Continued)

*Primary Examiner* — Christopher Braniff
(74) *Attorney, Agent, or Firm* — Yee & Associates, P.C.

(57) ABSTRACT

A method, system, and apparatus for fabricating a three-dimensional circuit is provided. In an embodiment, a method for fabricating a three-dimensional circuit by an additive manufacturing process includes determining a shape, location, and spatial orientation of a number of components, a number of dielectrics, and a number of metal interconnects for the three dimensional circuit. The method also includes obtaining fused filament fabrication (FFF) specific actions for a number of dielectric materials and the metal interconnects. The method also includes separating tool paths of the dielectric material and the metal interconnects into individual tool paths for each of the dielectric materials and the metal interconnects. The method also includes removing specific actions for one of the individual toolpaths from an FFF specific action. The method also includes rewriting the one of the individual toolpaths into micro-dispensing actions to control a tool for micro-dispensing ink.

20 Claims, 20 Drawing Sheets

(51) Int. Cl.
   *B29C 64/209* (2017.01)
   *B33Y 10/00* (2015.01)
   *B33Y 50/02* (2015.01)

(56) References Cited

OTHER PUBLICATIONS

Carranza et al., "Design and Hybrid Additive Manufacturing of 3-D/Volumetric Electrical Circuits," IEEE Transactions on Components, Packaging and Manufacturing Technology, vol. 9, No. 6, Jun. 2019, 8 pages.
Valentine et al., "Hybrid 3D Printing of Soft Electronics," Advanced Materials, vol. 29, No. 40, Oct. 25, 2017, 8 pages.
Goh et al., "Additively manufactured multi-material free-form structure with printed electronics," the International Journal of Advanced Manufacturing Technology, Jan. 2018, vol. 94, No. 1-4, pp. 1309-1316.
Agarwala et al., "A novel 3D bioprinted flexible and biocompatible hydrogel bioelectronic platform," Biosensors and Bioelectronics vol. 102, Apr. 15, 2018, pp. 365-371.
Soukup, "Circuit Layout," Proceedings of the IEEE, vol. 69, No. 10, Oct. 1981, pp. 1281-1304.
Church et al., "Printed Electronic Processes for Flexible Hybrid Circuits and Antennas," Flexible Electronics & Displays Conference and Exhibition, 2009, 7 pages.
Church et al., "Printed Circuit Structures, the Evolution of Printed Circuit Boards," Presented at IPC Apex Expo. Feb. 2013, 11 pages, website accessed Nov. 13, 2019, www.circuitinsight.com/pdf/printed_circuit_structures_ipc.pdf.
Deffenbaugh, "3D Printed Electromagnetic Transmission and Electronic Structures Fabricated on a Single Platform Using Advanced Process Integration Techniques," Aug. 2014, Dissertation Presented to the Faculty of the Graduate School of the University of Texas at El Paso, 227 pages.
Schindler-Saefkow et al., "Thermal Management in a 3D-PCB-Package with Water Cooling," in Electronics System Integration Technology Conf., Dresden, Germany, 2006, pp. 107-110.
Sterman et al., "PCB Origami: A Material-Based Design Approach to Computer-Aided Foldable Electronic Devices," J. Mech. Des., vol. 135, No. 11, Oct. 2013: 114502-114502-4, DOI: 10.1115/1.4025370, 8 pp.
Rumpf et al., "Electromagnetic Isolation of a Microstrip by Embedding in a Spatially Variant Anisotropic Metamaterial," Progress in Electromagnetics Research, vol. 142, 243-260, Sep. 2013, 18 pp.
Maalderink et al., "3D Printed structural electronics: embedding and connecting electronic components into freeform electronic devices," Plastics, Rubber and Composites, vol. 47(1), pp. 35-41, DOI: 10.1080/14658011.2017.1418165.
Bailey et al., "Augmenting Computer-Aided Design Software With Multi-Functional Capabilities to Automate Multi-Process Additive Manufacturing," IEEE Access, vol. 6, pp. 1985-1994, Feb. 2018, DOI: 10.1109/ACCESS.2017.2781249.
Periard et al. "Printing Embedded Circuits," in Proc. Solid Freeform Fabrication Symp., 2007, pp. 503-512.
Lipson et al., "Fabricated: The New World of 3D Printing," Hobken, NJ, USA: Wiley, 2013. www.wiley.com/en-us/9781118350638.
Espalin et al., "3D Printing Multifuntionality: Structures with Electronics," the International Journal of Advanced Manufacturing Technology. May 2014, vol. 72 Issue 5, 16 pages.
Ahn et al., "Anisotropic material properties of fused deposition modeling ABS," Rapid Prototyping Journal, vol. 8 Issue 4, pp. 248-257, https://doi.org/10.1108/13552540210441166.
Leigh et al., "A Simple, Low-Cost Conductive composite Material for 3D Printing of Electronic Sensors," PLOS One, vol. 7, Issue: 11, Nov. 2012, 6 pages.
Robles et al., "Automated Hybrid 3D Printing of 3D Meandering Interconnects", IEEE Transactions on Components, Packaging and Manufacturing Technology, vol. 9, Issue 6, Jun. 2019, 6 pages.
Carranza et al., "CAD Tool for Three-Dimensional Circuit Layout, Routing, and Manufacturing", IEEE Xplore, Conference: VLSI, 2003, Mar. 2003, 8 pages.

* cited by examiner

3D VOLUMETRIC CIRCUITS AND ASSOCIATED METHODS

RELATED PROVISIONAL APPLICATION

This application claims the benefit of U.S. Provisional Patent Application Ser. No. 62/758,134 filed Nov. 9, 2018, and entitled "3D Volumetric Circuits and Associated Methods."

STATEMENT OF GOVERNMENT INTEREST

This invention was made with United States Government support under contract W911NF-17-S-0002 awarded by the United States Army Research Lab and under contract FA8650-17-C-1011 awarded by the United States Air Force Research Lab. The United States Government has certain rights in this invention.

BACKGROUND

The disclosure relates generally to additive manufacturing techniques for fabricating three-dimensional circuit structures.

3D printing (3DP) is a rapidly evolving manufacturing technique that now offers the ability to build multi-material parts in a single process. While scalability is still being addressed, 3DP offers unquestionably strong capabilities for quick turn-around-time parts and customizability. It can build complicated geometries and structures that are simply not possible to produce by other means. The additional degrees of freedom offered by the third dimension hold great promise to manufacture circuits and electromagnetic elements in unconventional form factors and with greatly improved performance.

SUMMARY

An embodiment of the present disclosure provides a method for fabricating a three-dimensional circuit by an additive manufacturing process. The method includes determining a shape, location, and spatial orientation of a number of components, a number of dielectrics, and a number of metal interconnects for the three dimensional circuit. The method also includes obtaining fused filament fabrication (FFF) specific actions for a number of dielectric materials and the metal interconnects. The method also includes separating tool paths of the dielectric material and the metal interconnects into individual tool paths for each of the dielectric materials and the metal interconnects. The method also includes removing specific actions for one of the individual toolpaths from an FFF specific action. The method also includes rewriting the one of the individual toolpaths into micro-dispensing actions to control a tool for micro-dispensing ink.

Another embodiment of the present disclosure provides a method for fabricating a three-dimensional circuit by an additive manufacturing process. The method includes obtaining code for fabricating a dielectric portion and the metal portion of the three-dimensional circuit. The method also includes separating the code into a first code and a second code, wherein the first code comprises code to control a fused filament fabrication (FFF) additive manufacturing process to fabricate the dielectric portion of the three-dimensional circuit, and wherein the second code comprises code to control a micro-dispensing ink process to fabricate the metal portion of the three-dimensional circuit, wherein the first and second code are interlaced such that the fabrication process switches back and forth between forming the dielectric and forming the metal interconnect.

Yet another embodiment of the present disclosure provides a computer system for fabricating a three-dimensional circuit by an additive manufacturing process. The computer system includes a bus system; a storage device connected to the bus system, wherein the storage device stores program instructions; and a processor connected to the bus system. The processor executes the program instructions to: determine a shape, location, and spatial orientation of a number of components, a number of dielectrics, and of a number of metal interconnects for the three dimensional circuit; obtain fused filament fabrication (FFF) specific actions for a number of dielectric materials and the metal interconnects; separate tool paths of the dielectric material and the metal interconnect into individual tool paths for each of the dielectric materials and the metal interconnects; remove specific actions for one of the individual toolpaths from a n FFF specific action; and rewrite the one of the individual toolpaths into micro-dispensing actions to control a tool for micro-dispensing ink.

DETAILED DESCRIPTION

Figure 1:
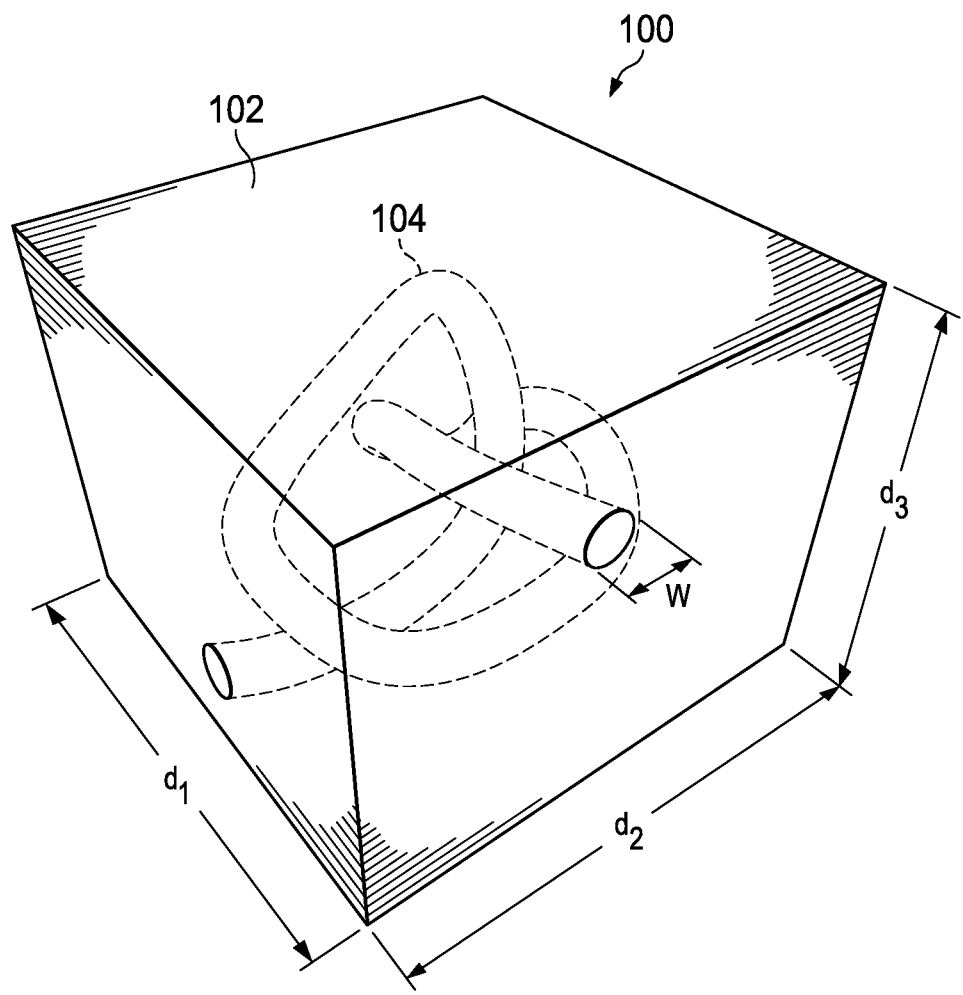
FIG. 1 is a 3D design of a meandering electrical trace in accordance with an illustrative embodiment.

Aspects of the present invention are described herein with reference to diagrams of methods and apparatuses according to embodiments of the invention. The diagrams in the figures illustrate the architecture and operation of possible implementation methods according to various embodiments of the present invention.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive.

Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

For purposes of the description hereinafter, the terms "upper," "lower," "right," "left," "vertical," "horizontal," "top," "bottom," and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g. interface layer, may be present between the first element and the second element.

In this disclosure, when an element, such as a layer, region, or substrate is referred to as being "on" or "over" another element, the element can be directly on the other element or intervening elements can also be present. In contrast, when an element is referred to as being "directly on," "directly over," or "on and in direct contact with" another element, there are no intervening elements present, and the element is in contact with another element.

The processes, steps, and structures described below do not form a complete process flow for acoustic metamaterials. The disclosure can be practiced in conjunction with 3D printing techniques currently used in the art, and only so much of the commonly practiced process steps are included as necessary for an understanding of the different examples of the present disclosure. The Figures represent cross sections of a portion of a printed object during fabrication and are not drawn to scale, but instead are drawn so as to illustrate different illustrative features of the disclosure.

As used herein, the phrase "at least one of", when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B and ten of item C; four of item B and seven of item C; or other suitable combinations.

As used herein, the terms "optimize", "optimization", and "optimizing" do not necessarily mean that the result is the very best possible result, but rather merely mean that an optimized value is a value the produces a desired result, the desired result possibly being a range of acceptable values or within a specified bound, or optimization may merely mean an improvement or change in a quality as compared with an unoptimized value. In an aspect, "optimizing" means tuning a variable such that a resulting property is within a range of acceptable resulting properties.

The illustrative embodiments recognize and take into account one or more considerations. For example, the illustrative embodiments recognize and take into account that in the prior art, there is no slicing software that can automatically generate g-code for multi-material parts due to their being very different physics associated with driving different printing tools. Interestingly, the hardware for hybrid 3DP is quite advanced but the software, algorithms, and processes for driving the printers is almost non-existent. The illustrative embodiments further recognize and take into account that to date, hybrid 3DP involves a lot of human intervention, which severely limits what can be done. The illustrative embodiments recognize and take into account that most of the research done in 3DP electronics entail 2D, or 2.5D, designs to circumvent the limitations of current hybrid 3DP. The illustrative embodiments further recognize and take into account that while very promising and exciting, the idea of using 3DP to manufacture parts with electro-mechanical functionality is relatively new and requires the ability to build parts using multiple materials and multiple tools within a single 3D printer.

The illustrative embodiments recognize and take into account that the current circuit technology makes heavy use of printed circuit boards (PCBs) for the realization of electronic devices. Popular software for PCB design include Proteus, DipTrace, Solidworks PCB, Mentor Graphics, and Altium Designer. While highly mature, today's PCBs are almost exclusively planar. Tremendous benefits could be gained if those same circuits could be made three dimensional (3D). True 3D circuits have equal freedom in x, y, and z directions. Components can be placed at any position and be oriented at any angle, which can lead to minimizing trace lengths, volume, and weight of the circuit. Interconnects can meander smoothly throughout the circuit following spline paths, reducing parasitic impedance to maximize bandwidth and efficiency. 3D circuits can inherently be formed into unconventional form factors and exploit physics that is not possible in conventional planar circuits. For all of these reasons, 3D circuits could surpass the performance of conventional 2D circuits in many ways.

The illustrative embodiments recognize and take into account that previously, utilizing the third dimension was accomplished in a 2.5D manner by stacking 2D PCBs on top of one another and connecting them vertically using vias, collapsing connected PCBs on top of one another reminiscent to origami, and 3D printing flexible materials and traces for wearable electronics. The illustrative embodiments recognize and take into account that the use of the third dimension in these approaches is highly limited as they are still being manufactured in 2D settings. The illustrative embodiments further recognize and take into account that, therefore, these previous approaches cannot take full advantage of the benefits offered by the third dimension.

The illustrative embodiments recognize and take into account that 3D printing has evolved to where manufacturing complicated 3D circuits is possible. The illustrative embodiments further recognize and take into account that, however, before this new design paradigm can be explored further, a dedicated design and layout tool for 3D circuits is critically needed. The illustrative embodiments further recognize and take into account that there was a recent effort to develop a 2.5D software. The illustrative embodiments further recognize and take into account that their manufacturing process was to print a substrate with voids for the components, route the interconnects via wire-embedding, manually place the electronic components, and print another substrate to cover the electronics. The illustrative embodiments further recognize and take into account that, however, their procedure only demonstrated 2.5D and was not able to achieve arbitrary component orientation or meandering lines in a true 3D setting. The illustrative embodiments further recognize and take into account that the 3D circuits developed using 2.5D software are therefore highly limited.

The illustrative embodiments of a 3D design and layout tool disclosed herein provides complete freedom for component placement and interconnect routing.

In illustrative embodiments, a completely automated CAD-to-print process flow for hybrid direct-write 3D printing is disclosed. In an illustrative embodiment, this capability is adapted to manufacture a meandering conductive trace formed into the shape of a pretzel. In illustrative embodiments, the manufacturing proved to be a reliable automated process that can potentially be used to manufacture 3D circuits. The illustrative embodiments further recognize and take into account the need for better slicing techniques for hybrid manufacturing.

In an illustrative embodiment, a reliable automated process that requires no human intervention or manual coding of process steps. In an illustrative embodiment, the disclosed process presented herein enables the realization of more geometrically complex 3D circuits as well as many other 3D multi-material elements. The illustrative embodiments recognize and take into account that in order to manufacture electronics, especially 3D electronics, in a single seamless process step, hybrid 3DP is desirable. In one or more illustrative embodiments, true 3D circuits allow interconnects to meander smoothly throughout all three dimensions without being confined to planes. In illustrative embodiments, components can be placed at any position and be in any orientation throughout the circuit. In illustrative embodiments, a computer-aided design (CAD) tool for 3D circuits is disclosed to layout components and route interconnects. To manufacture the designed circuits, this disclosure provides a completely automated CAD-to-print process flow for hybrid direct-write 3DP.

In illustrative embodiments, a fully three-dimensional (3D) electric circuit is modeled in a 3D environment and manufactured via an automated hybrid direct-write 3D printing process. The illustrative embodiments recognize and take into account that the implications and applications of this significant achievement are enormous because it allows circuits to be designed and manufactured in virtually any form factor. In an illustrative embodiment, to accomplish this, a custom CAD tool was programmed into an opensource modeling software to layout components and route interconnects. The custom CAD tool imports the netlist and component geometries from a schematic capture program. Components can be placed at any position and be oriented at any angle. Interconnects can meander smoothly throughout the circuit following 3D splines. The interconnects can be placed manually or automatically between components. After laying out the components and routing interconnects, the tool exports Standard Tessellation Language (STL) files of the dielectric and metal portions of the final circuit to be 3D printed. To manufacture the circuit, fused-deposition modeling (FDM) of ABS plastic and micro-dispensing (µD) of DuPont CB028 silver paste were used. To demonstrate, a functional 555 timer circuit was designed and built to flash an LED.

In an illustrative embodiment, to demonstrate the disclosed process flow with a complicated 3D shape, an electrical trace was designed to meander in the shape of a pretzel. The geometry was generated using the open-source software Blender. The pretzel shape was chosen for illustrative purposes and it is representative of how interconnects may look in 3D circuits.

Turning now to the Figures and in particular, to FIG. 1. FIG. 1 is a 3D design of a 3D component 100 having a body with a meandering electrical trace in accordance with an illustrative embodiment. FIG. 1 is shows the design realized in this research. 3D component 100 includes a body 102, typically a dielectric, with a meandering electrical trace 104 within it. In an embodiment, the dimension of the component 100 is a cube of dimensions $d1=d2=d3=1.0$ centimeters (cm) and the width of the meandering electrical trace is $w=1.0$ mm. Observe that the vertical meandering of the pretzel meandering electrical trace 104 has been exaggerated in order to make it more three-dimensional and a better exercise and demonstration of our process flow.

Figure 2:
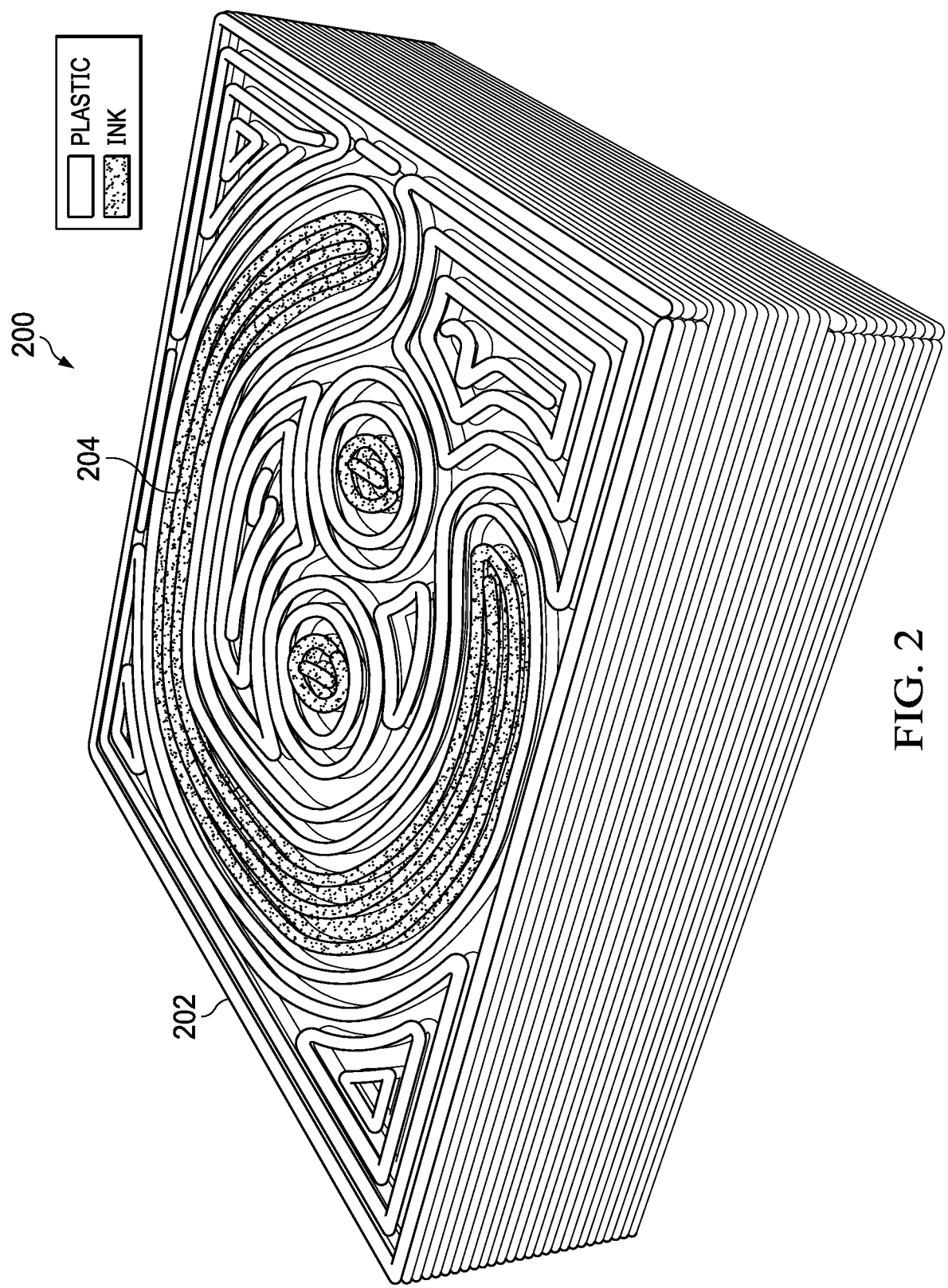
FIG. 2 is a cross-sectional view of a dual-filament slicing of a pretzel line in accordance with an illustrative embodiment.

FIG. 2 is a diagram of a cross sectional view of a 3D component showing a dual-filament slicing of a pretzel line in accordance with an illustrative embodiment. 3D component 200 may be 3D component 100 shown in FIG. 1. The 3D component 200 includes plastic 202 and ink 204. The ink 204 may be a metal ink. The ink 204 is a meandering electrical trace such as meandering electrical trace 104 in FIG. 1.

In an illustrative embodiment, two stereolithography (STL) files are generated where one represented the dielectric and the other the metal. These are generated so that no gaps or overlaps existed between the objects. In an illustrative embodiment, these STL files were processed using Slic3r, an opensource software tool that generates g-code from STL files to drive a 3D printer. Repetier was used to load the files and call Slic3r to generate the g-code. The process starts by loading the STL files into Repetier and generating the g-code with two paths, both intended for fused filament fabrication (FFF). In a later step, the g-code for one of the filament paths is converted to g-code that drives a micro-dispenser in an nScrypt hybrid direct-write 3D printer. In an illustrative embodiment, one of the main problems of hybrid 3DP is combining different physics in a single process. The illustrative embodiments recognize and take into account that current slicing software can generate g-code for multi-filament FFF, but the physics and g-code syntax is the same for all paths. This means the metal path of the pretzel line is initially generated with FFF build parameters. The disclosed methods and systems remove the FFF specific actions and inserts microdispensing actions for the metal path. The plastic path remains unchanged. FIG. 2 shows a cross section of the sliced pretzel line.

Figure 3:
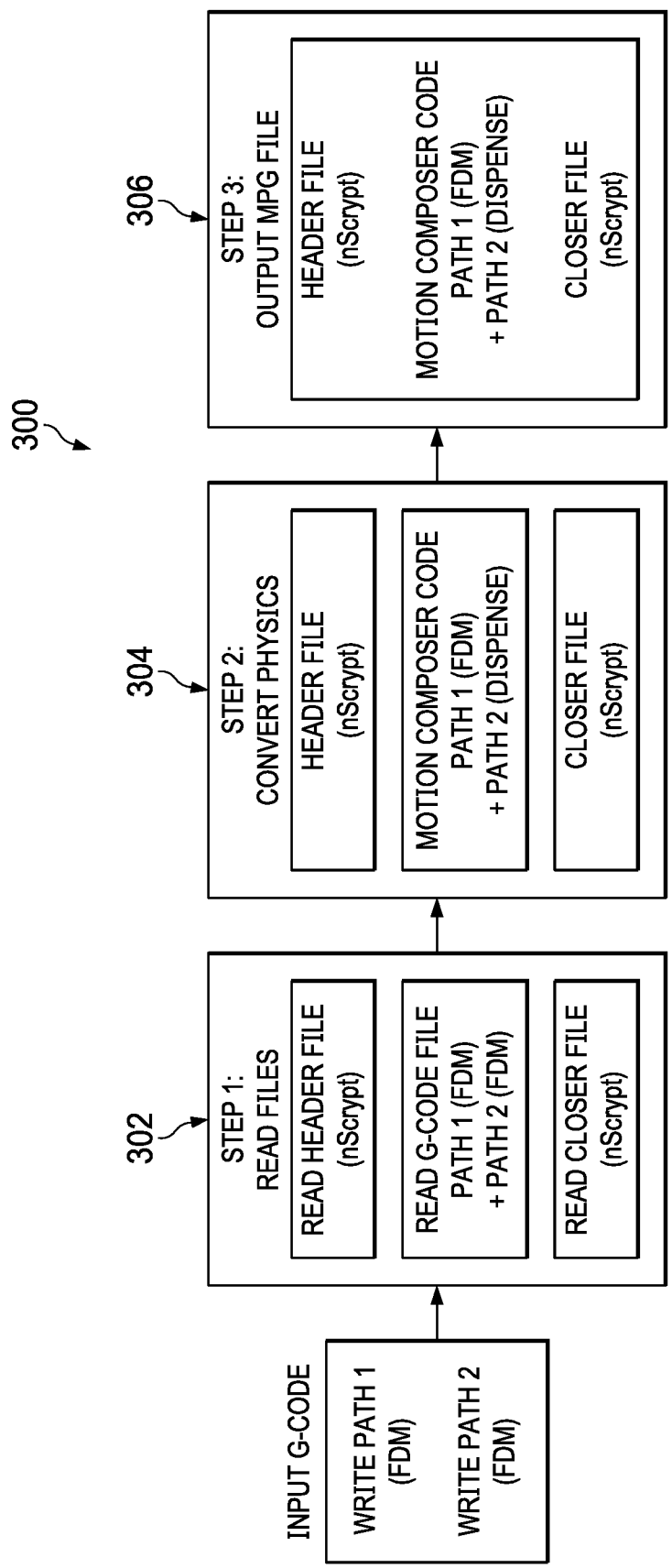
FIG. 3 is a diagram of a hybrid pgm file generation tool in accordance with an illustrative embodiment.
Figure 4A:
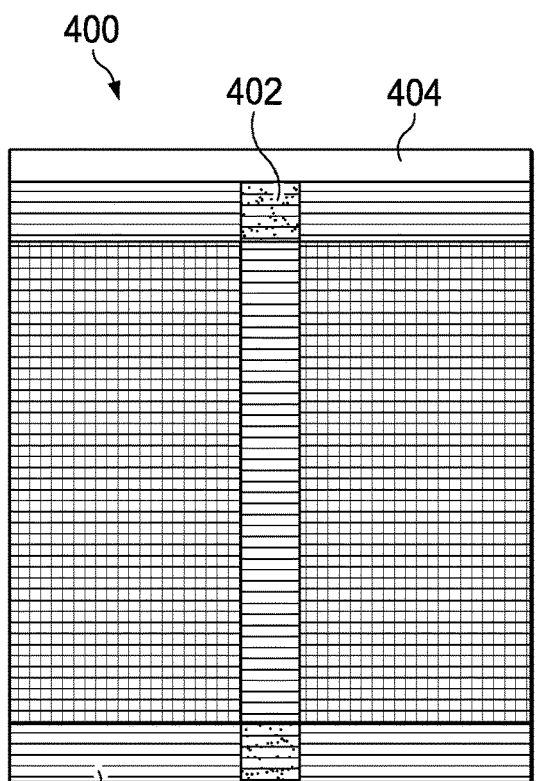
FIGS. 4A-4D are diagrams of a progression of multi-layer prints in accordance with an illustrative embodiment.
Figure 4B:
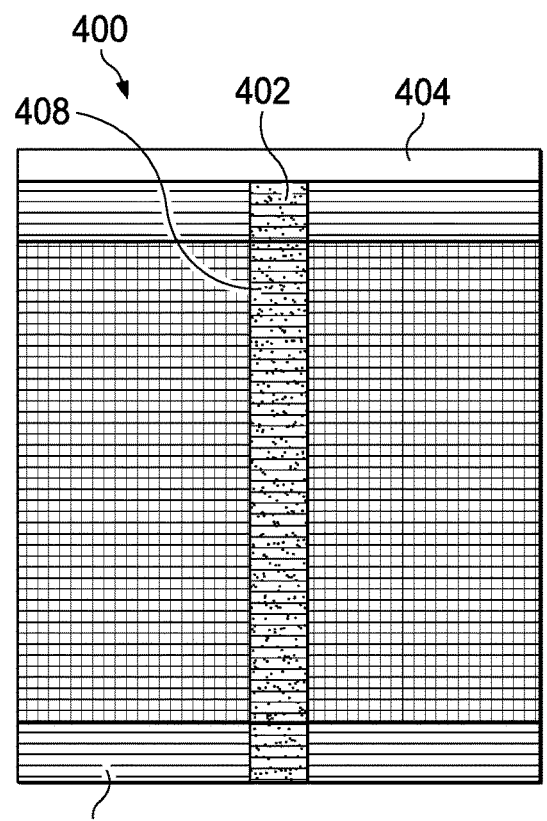
Figure 4C:
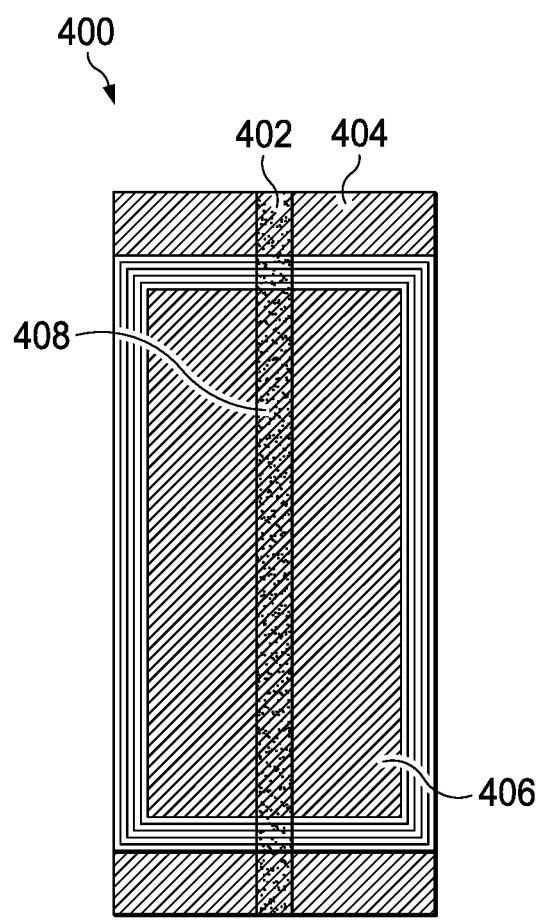
Figure 4D:
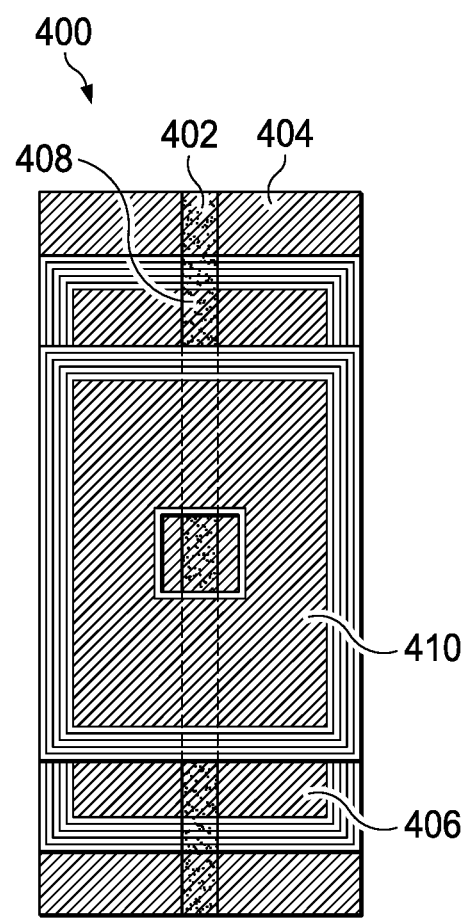

In an illustrative embodiment, the disclosed method, shown in FIG. 3, includes three steps that converts Slic3r multi-material g-code into the language used by the nScrypt 3D printer. Step one 302 reads the dual-filament g-code files along with header and closer files that initialize and close out the nScrypt 3D printer. Step two 304 separates the individual tool paths and redefines one of them to be for micro-dispensing. In an embodiment, FFF specific actions for this toolpath are removed and rewritten with micro-dispensing actions needed to control the nScrypt's SmartPump™ tool for micro-dispensing ink. Finally, step three 306 collects all of the changes and saves it as a text file with the instructions specific to the manual pulse generator (MPG) Aerotech® A3200 Motion Composer Suite "pgm" file that drives our nScrypt Table Top machine.

In an embodiment, the first part of the software reads three files into memory, a header file that initializes all the fields needed to start the process of 3DP, a g-code file that contains the dual-filament printing sequence, and a closer file that has the closing commands for resetting the nScrypt machine for the next print job. It loads all three of these as text files. As the g-code is being read, it is parsed and saved in a structure in MATLAB so that it can be more easily manipulated. The header and closer files are stored as a simple sequence of text lines. Oversimplifying the disclosed method, it proceeds one line of g-code at a time and converts it to pgm-code used by the nScrypt. Table I summarizes how the commands are translated.

TABLE I

3DP COMMANDS BETWEEN G-CODE AND PGM-CODE

| Function | g-code | pgm-code |
|---|---|---|
| Motion x, y, z | G1 | G1 |
| Tool selection | T0, T1 | A, B |
| Speed | F | F |
| Comments | ; | // |
| Units | mm/min | mm/sec |
| Extrusion | T0 and E | B |
| Micro-dispensing | T1 and E | MOVE ABS A |

Several g-code M and S commands are ignored because they are not needed in pgm-code like the fan speed, temperature setting, printing origin, and many others. At the start of our program, settings are defined for initializing the nScrypt machine such as the printing height floor value, values for closing and opening valves, travel speeds, and offset distance values between the Smart Pump™ and the nFD™ pump. Unfortunately, the conversion is not as simple as a one-to-one conversion of g-code to pgm-code and there are several places that perform look-ahead functions. The first look-ahead scans the g-code to find the first G1 command that sets the z height. This is used to initialize the z height at the start of the pgm-code. As the g-code is scanned, T0 and T1 commands set which filament is being deposited. These correspond to the Smart Pump™ and nFD™ pump in the pgm-code. Here, additional pgm-code is inserted to handle switching between the pumps. This entails closing the previous pump, initializing the new pump, and offsetting the position between the pumps. It was necessary to look-ahead to identify stop-start printing on the same layer and insert pgm-code to raise the height of the pump during the non-printing movements in order to avoid collision with previously dispensed structures. In an embodiment, another look-ahead was needed to identify ramp-down for the filament path corresponding to the micro-dispenser. The g-code ramp-down was removed and replaced in the pgm-code with the ramp down specific to the nScrypt for micro-dispensing. If a G command is read, the g-code E extrusion command is converted to pgm B command for extruding nFD™ and an A command for changing the valve value to open or close dispensing accordingly. A unit conversion for the F command was necessary that takes the feed rate from Slic3r in mm/min and coverts it to mm/sec for the pgm-code. After all these steps, the method converts the new set of commands to lines of text and then adds the header and closer text files to the beginning and end, respectively. This is saved as a single pgm file.

In an illustrative embodiment, to manufacture the pretzel line, an nScrypt Tabletop series 3D printer is used. This is a hybrid 3D printer capable of depositing plastic via FFF and depositing conductive inks via micro-dispensing. For micro-dispensing the conductive ink, we used nScrypt's second-generation SmartPump™ 100 system since it can control volume down to 100 pL, with a resolution of 0.1 µm. It was used to produce metal lines as small as 75 µm in width and 25 µm in height. The dielectric was deposited using nScrypt's nFD™ pump since it produces 120 µm line widths easily out of 1.77 mm thick filament lines. The pretzel line was made from silver ink (DuPont CB028) and its support plastic was acrylonitrile-butadiene-styrene (ABS). Table II summarizes our printing parameters for the pretzel line.

TABLE II

| | PRINTING PARAMETERS | | | |
|---|---|---|---|---|
| | nTips | Dispense gap | Print ratio | Print speed |
| SmartPump ™ | 360 µm | 45 µm | 1.06 | 60 mm/s |
| nFD ™ | 370 µm | 110 µm | 0.98 | 20 mm/s |

The process parameters were optimized so that long prints could be done without having to interrupt the process. This helped the repeatability of the prints and to stay consistent. Initially, we experimented with different layer thicknesses and observed how the thickness affected the formation of ink making contact between layers. Ideally, layers with thickness of 25 µm are preferable, but the limit for us was 50 µm. Voids were intentionally left in the plastic regions to go back and fill with dispensed ink late. The plastic voids were set to 500 µm in cross section to be able to hold a uniform amount of ink. It was ensured that there was no conductive ink creeping between the printed ABS layers because this could cause short circuits or break the interconnect itself. We observed that thinner ink layers were more conductive, likely due to being better cured. In an embodiment, we observed that our multi-material 3D printer required an extra 20 seconds of layer transition time between ink and plastic to allow enough time for in-site thermal curing. In an embodiment, it was found that the heat produced by the printer was sufficient for curing the inks and no extra steps with lasers or heat lamps was needed.

FIG. 4 shows a progression of samples that were manufactured for building electrical traces which cross different vertical layers. In FIG. 4A, a single conductive line 402 was sandwiched between two layers of ABS 404, 406. In FIG. 4B, a second conductive line 408 was added to the top layer to form a trace that stepped one layer up and then stepped one layer down. Conductivity was measured between the two lines to ensure they were not shorted. The processes in FIG. 4B was repeated in FIG. 4C, but the nozzle sizes for both ink and plastic were matched to make thinner layers with our method. This helped the interconnects to be consistent through multiple layers. Finally, in FIG. 4D, an extra layer of plastic was added onto the top of the part with a window in the middle to inspect the printed line.

In an embodiment, as the printing parameters were optimized, a strong need was observed to keep the printing tools and area very clean though the whole process. The pen tips accumulate excess material that can be dropped on the part creating electrical continuity problems.

Figure 5A:
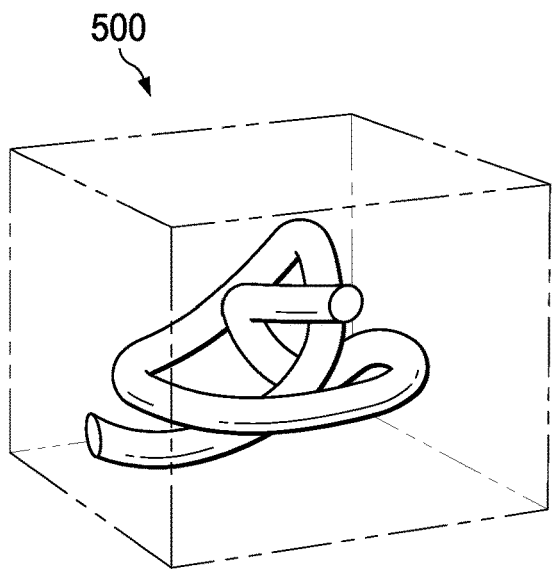
FIGS. 5A-5C are diagrams of a CAD design for a pretzel and a hybrid 3DP partial build and full build of a 3DP pretzel line using a hybrid slicing tool according to an illustrative embodiment.
Figure 5B:
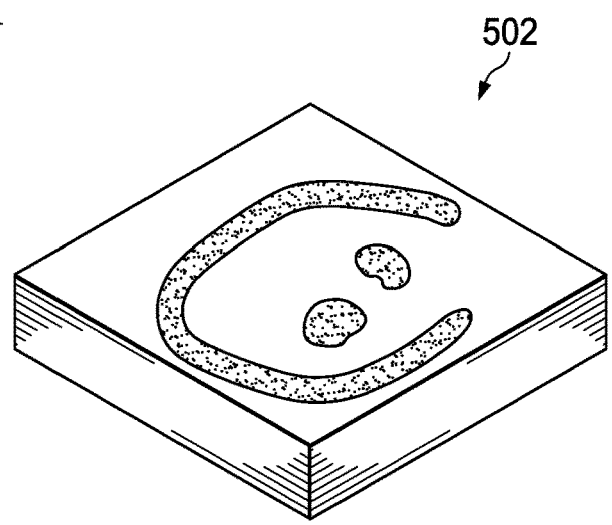
Figure 5C:
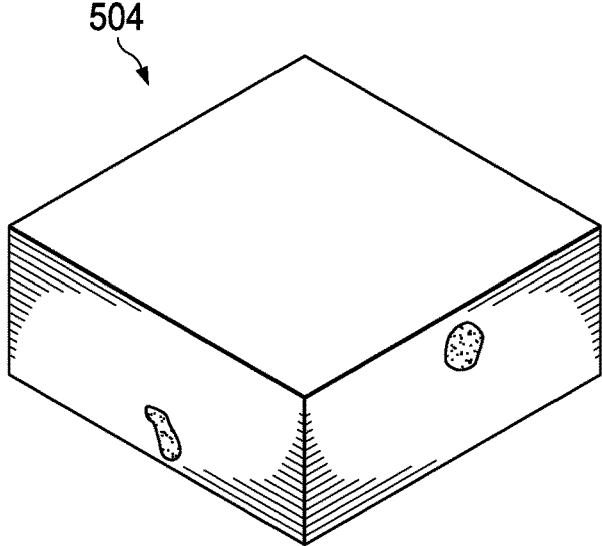

FIGS. 5A-5C show a 3DP pretzel line imbedded in plastic in accordance with an illustrative embodiment. FIG. 5A shows a CAD design 500 for the 3DP pretzel line imbedded in plastic in accordance with an illustrative embodiment. FIG. 5B shows a hybrid 3DP partial build 502. FIG. 5C shows a hybrid 3DP full build 504.

As the pretzel line was printed, encouraging results of 0.5Ω resistance over the total length of 23 mm of line was measured. It took 1 hour and 28 minutes to execute the print job. TABLE III presents the final measurements for the 3D printed pretzel line using the hybrid 3D printing tool.

TABLE III

DETAILED RESULTS FOR THE 3D PRINTED PRETZEL LINE

| Parameters | Measured values |
| --- | --- |
| Resistance | 0.463 Ω |
| Length of line | 23 mm |
| Printing time | 1 hour 28 min |
| Layer count | 19 layers |
| Total number of lines | 5576 |
| Filament extruded | 292 mm |
| Ink dispensed | 3.6 cu. mm |

After printing an initial batch of pretzel lines, problems of inconsistent ink dispensing were observed that resulted in continuity breaks. The Army Research Lab (ARL) utilized x-ray micro computed tomography (micro-CT), measured via a Zeiss Xradia 520 micro-CT system, to detect ink continuity and porosity. The sample was observed to have ink present throughout the length of the channel. Porosity was observed to be sufficient to make reliable electrical connections, but a few discontinuities were identified.

Figure 6A:
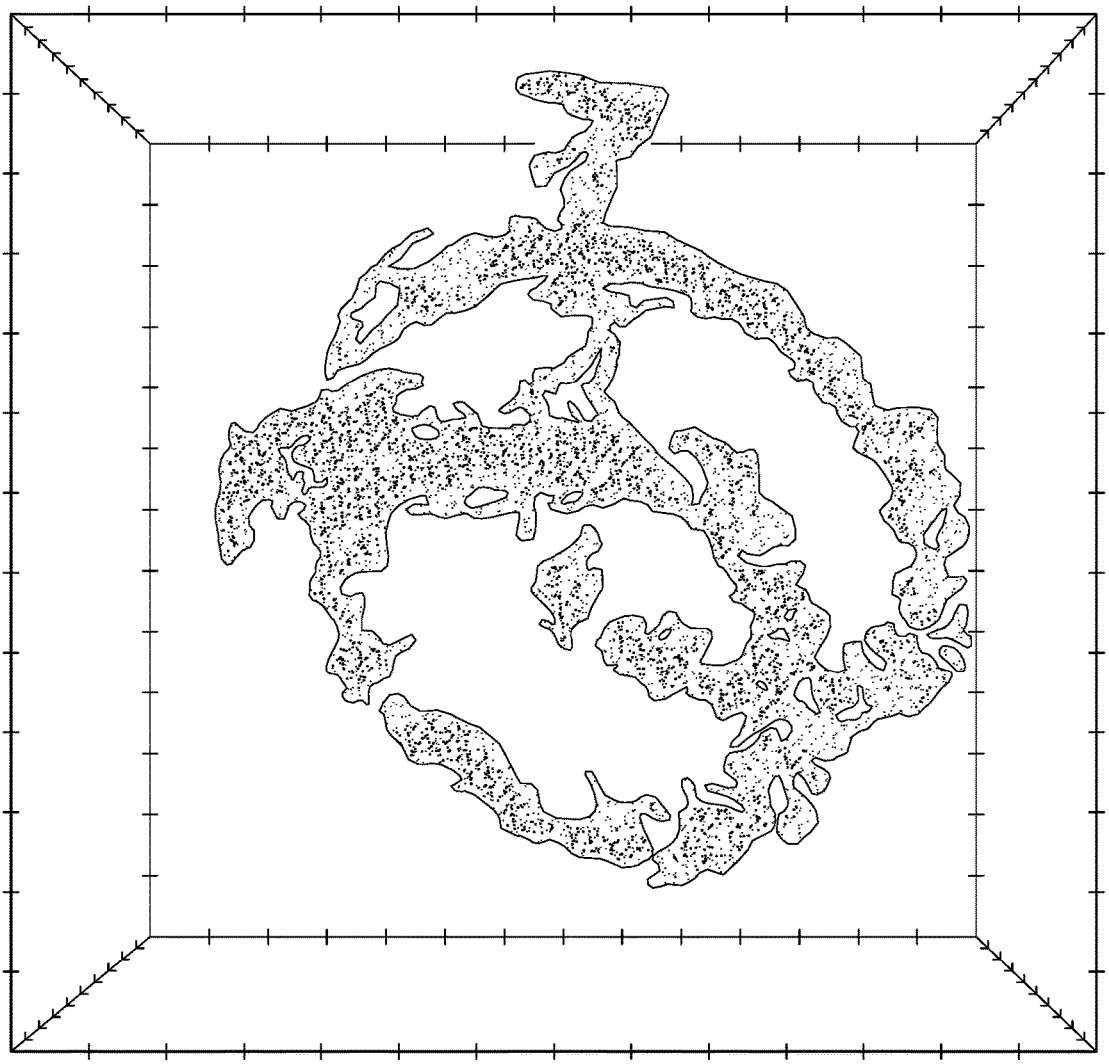
FIG. 6A is a diagram of a micro-CT imaging from a pretzel line for metal layers of the line in accordance with an illustrative embodiment.
Figure 6B:
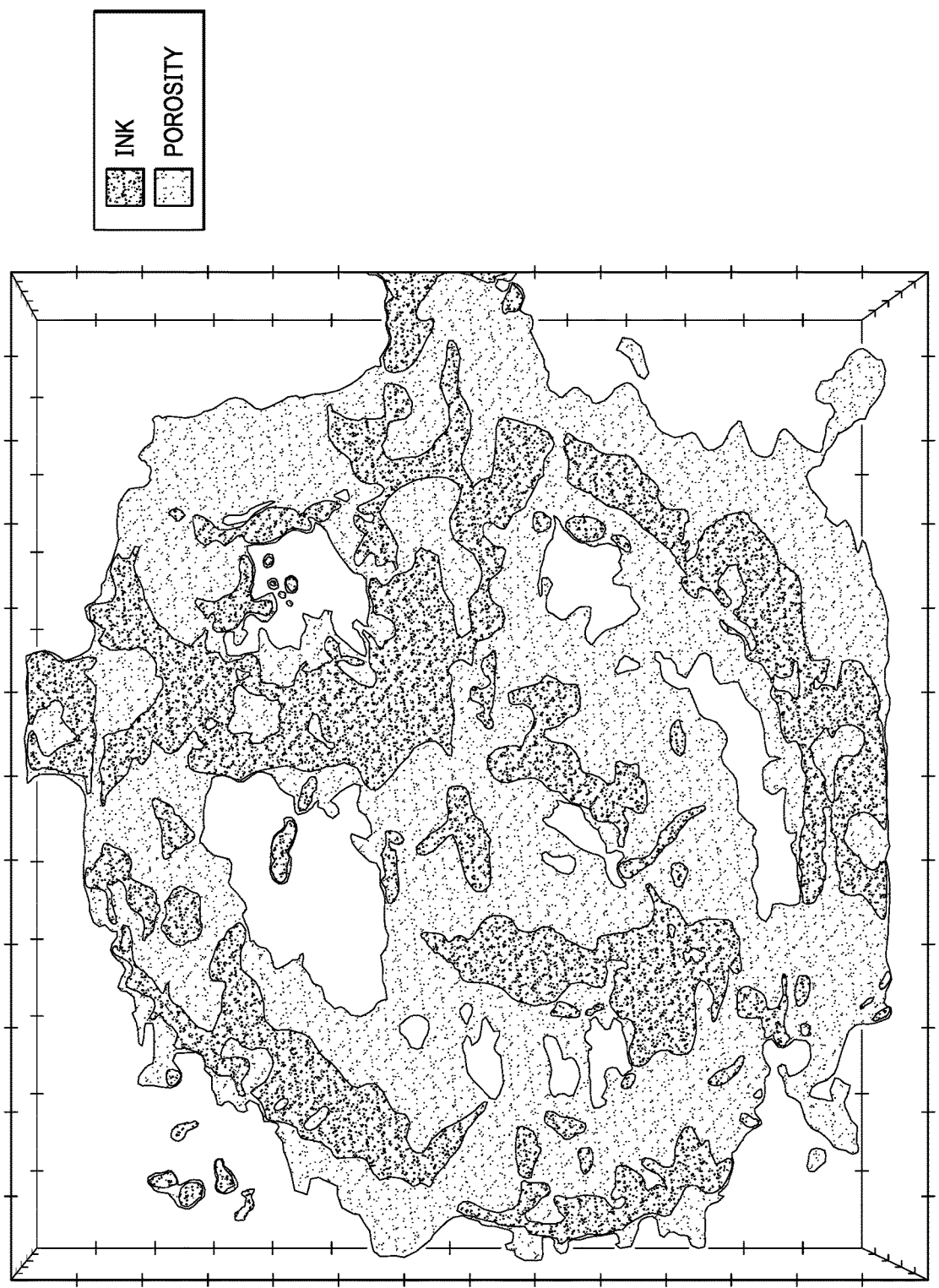
FIG. 6B is a diagram of a micro-CT imaging for ink versus porosity in accordance with an illustrative embodiment.

FIGS. 6A-6B shows the micro-CT ink pretzel on and the porosity and continuity readings on the right. FIG. 6A shows the micro-CT ink pretzel 602 and FIG. 6B shows a graph 604 of the porosity and continuity readings. The results suggest that the pen tip sizes should be reduced from 300 μm to 150 μm, or perhaps even 75 μm, to increase the resolution of the prints and solve the porosity and discontinuity problems observed in micro-CT.

Current slicing methods are not designed for multimaterial devices in the same process. Despite the present work demonstrating a fully automated CAD-to-print process flow, there is a strong need to for improved slicing methods that are better suited for generating g-code that handles different types of materials and different printer tools in one print. For more complicated circuits, we foresee long build times due to switching between tools and allowing for curing time. Better path planning and alternative methods of curing will shorten the build time considerably. In an embodiment, we also see a need to maintain cleanliness of the printheads throughout the print if more materials and processes are added. One solution is to add cleaning tools for the printing nozzles. As the print progresses for several hours, the material residue can be periodically cleaned between layers to avoid adding material residue. Another solution is to add brims around the printed device so the printer has a chance of purging the nozzles as it dispenses materials outside the part. This also helps to push excess materials off the nozzles on the brims. However, it is not ensured that the excess material will fall on the brim lines. While some manufactured samples were not electrically conductive due to breaks in the line, others exhibited a total resistance of around 0.5Ω. There is a need for improving the conductive materials in viscosity, density, and conductivity because the silver ink used in this work clogs the pen tips with diameters less than 75 μm. It will be very useful if the silver particles inside the conductive ink are spherical and range in sizes between 50 nm to 1 μm. This will make the ink more fluid, as the particle shape will keep the clogging down, and the printing features can go even smaller. However, there are conductivity problems with spherical particles. Adding a post curing process with lasers or heaters might mitigate the conductivity problem.

Figure 7:
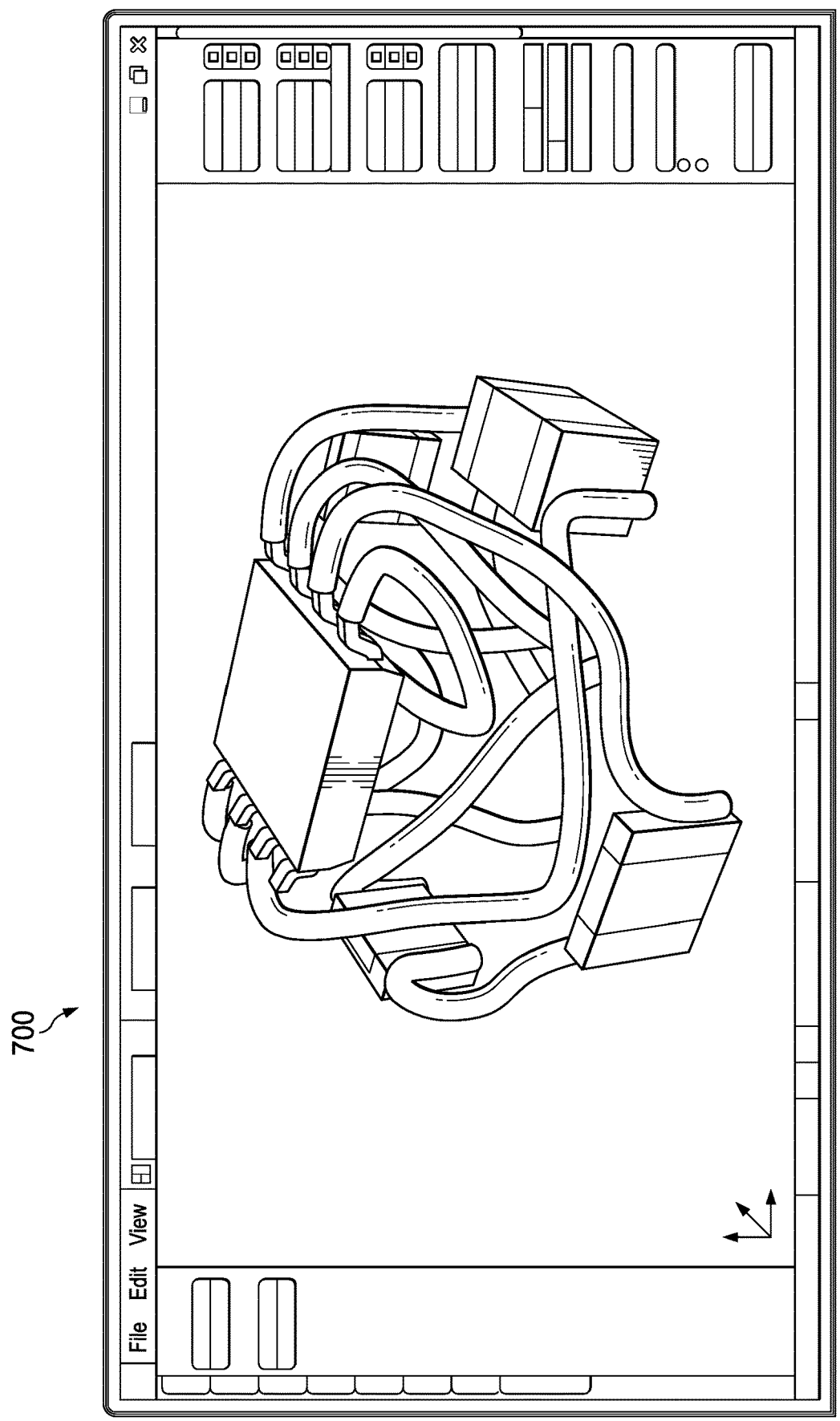
FIG. 7 is a screenshot of a blender 3D circuit tool environment in accordance with an illustrative embodiment.

FIG. 7 is screenshot 700 of Blender 3D circuit tool environment in accordance with an illustrative embodiment. Blender 3D circuit tool environment is an example of a software tool that may be used to implement various processes of the disclosed methods and systems. The main tab "3D Layout & Design" is selected showing the options for selecting components and interconnects. "Netlist" imports the corresponding circuit components depending on the netlist selected. "Single Component" imports a single component model. "Via" draws a normal interconnect wherever the cursor is. "Parallel Plate" draws a parallel plate transmission line.

Figure 8:
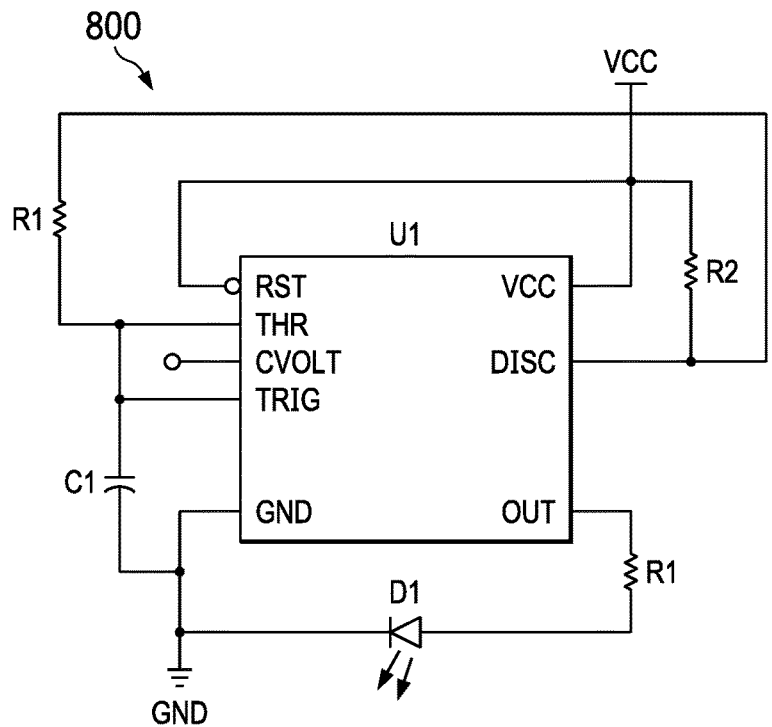
FIG. 8 is a diagram of a circuit schematic for a blinking 555 timer circuit in accordance with an illustrative embodiment.

FIG. 8 shows a circuit schematic 800 for a blinking 555 timer circuit in accordance with an illustrative embodiment.

Figure 9:
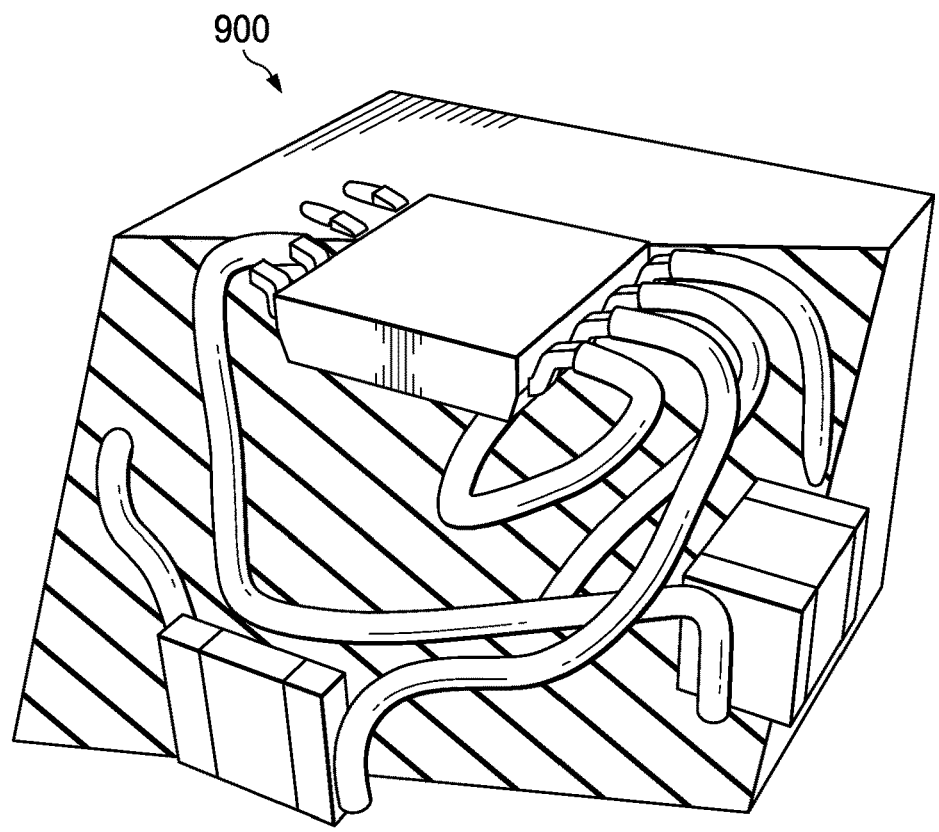
FIG. 9 is a diagram of a model of the circuit schematic of FIG. 8 showing components, interconnects, and sliced substrate in accordance with an illustrative embodiment.

FIG. 9 shows a corresponding model 900 to circuit schematic 800 showing components, interconnects, and sliced substrate in accordance with an illustrative embodiment.

Figure 10:
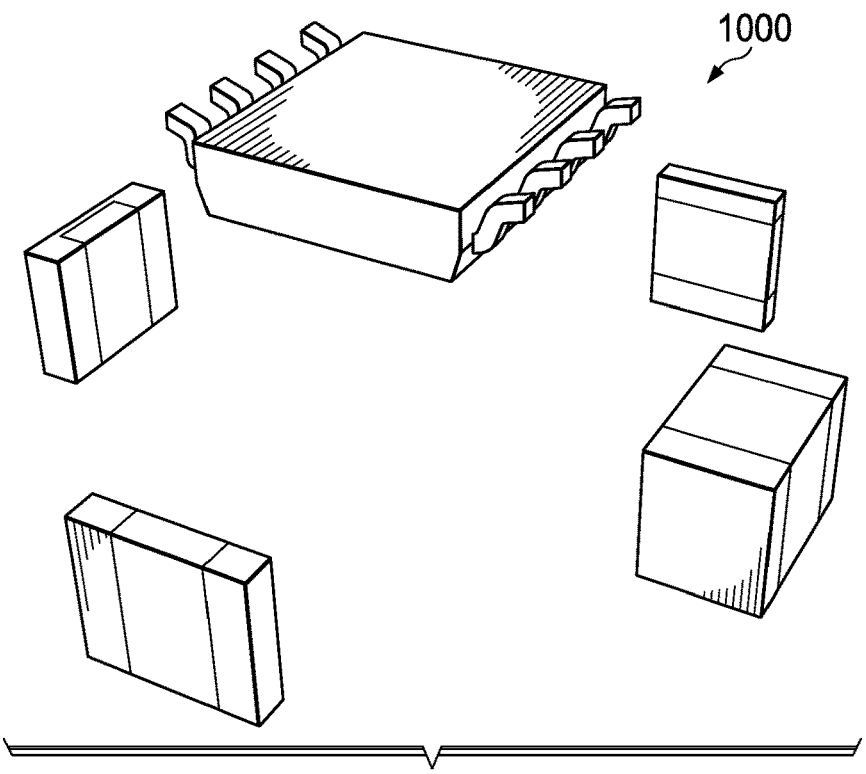
FIG. 10 is a diagram of a 3D layout of 555 timer circuit components in accordance with an illustrative embodiment.

FIG. 10 shows a 3D layout 1000 of a 555 timer circuit components in accordance with an illustrative embodiment.

Figure 11:
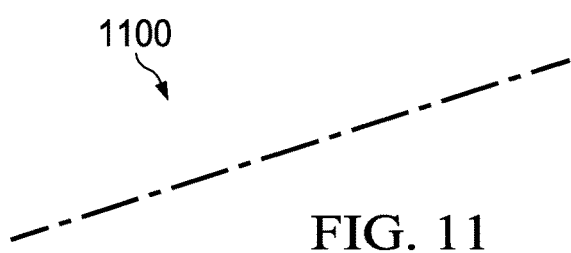
FIG. 11 is a nubs path showing the generation of an interconnect in accordance with an illustrative embodiment.

FIG. 11 shows a Nurb path 1100 for the generation of the interconnect in accordance with an illustrative embodiment.

Figure 12:
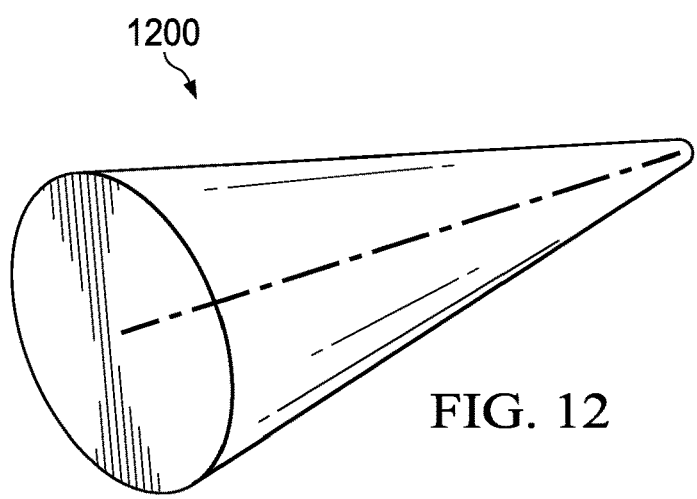
FIG. 12 is a drawn body of an interconnect depicted in accordance with an illustrative embodiment.

FIG. 12 shows a drawn body 1200 of the interconnect in accordance with an illustrative embodiment.

Figure 13A:
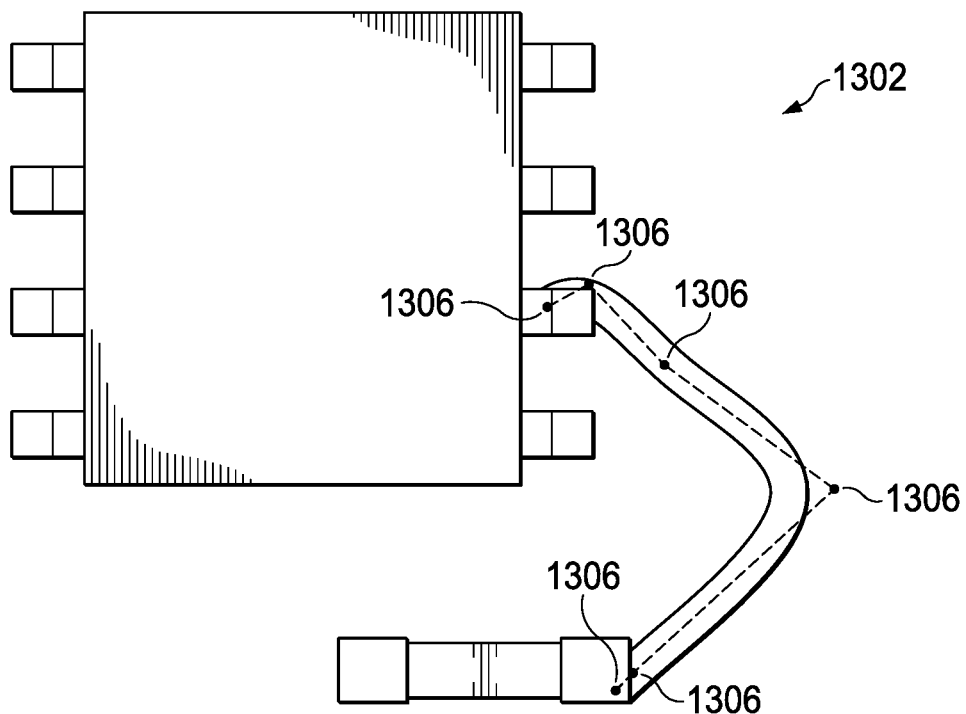
FIGS. 13A-13B show a top view and a perspective view of an interconnect drawn between an IC and a surface mount component in accordance with an illustrative embodiment.
Figure 13B:
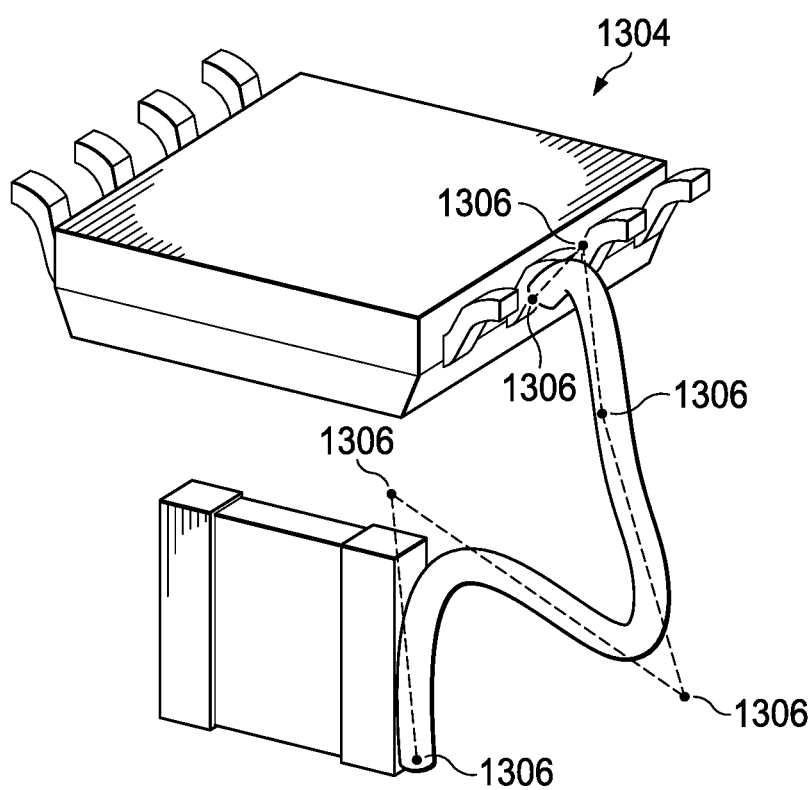

FIG. 13A shows a top view 1302 and FIG. 13B shows a perspective view 1304 of an interconnect drawn between an IC and surface mount component. The control points are depicted as dots 1306 along the interconnect.

Figure 14:
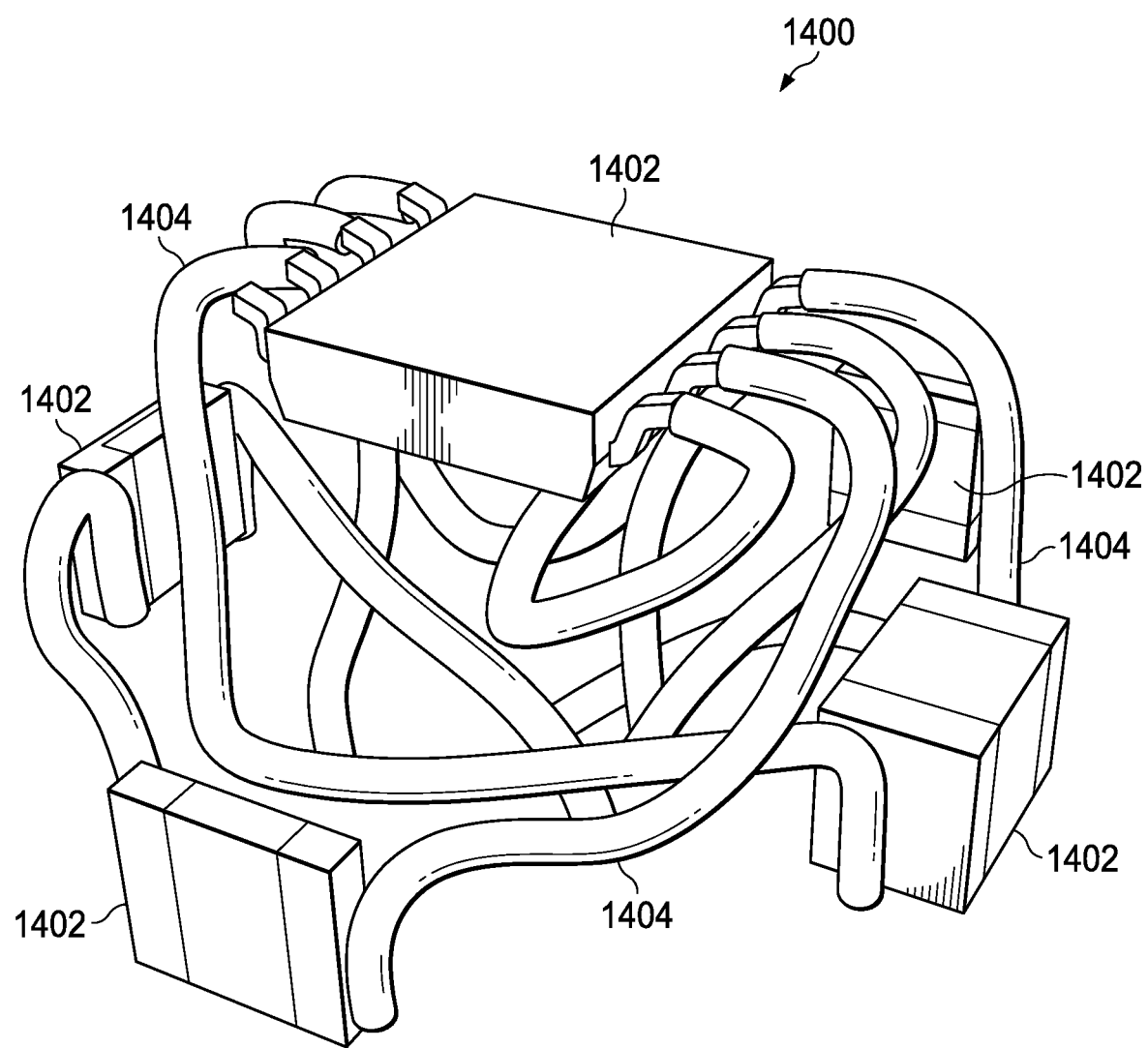
FIG. 14 is a final 555 circuit model with components and interconnects in accordance with an illustrative embodiment.

FIG. 14 is a final 555 circuit model 1400 with components 1402 and interconnects 1404 (dielectric not shown) in accordance with an illustrative embodiment.

Figure 15A:
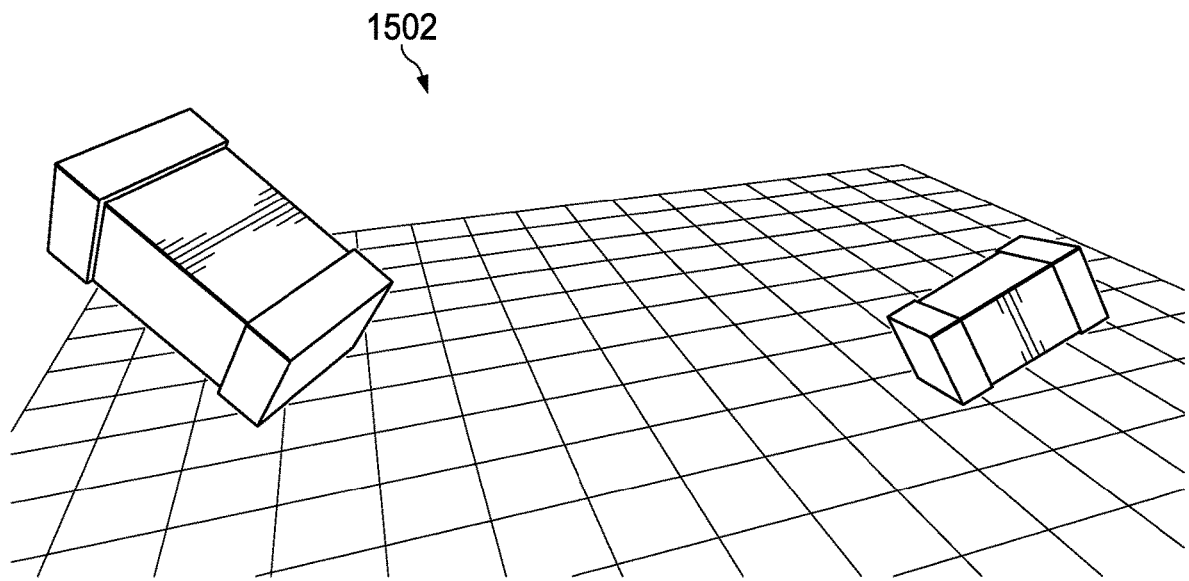
FIGS. 15A-15D show a routing process in accordance with an illustrative embodiment.
Figure 15B:
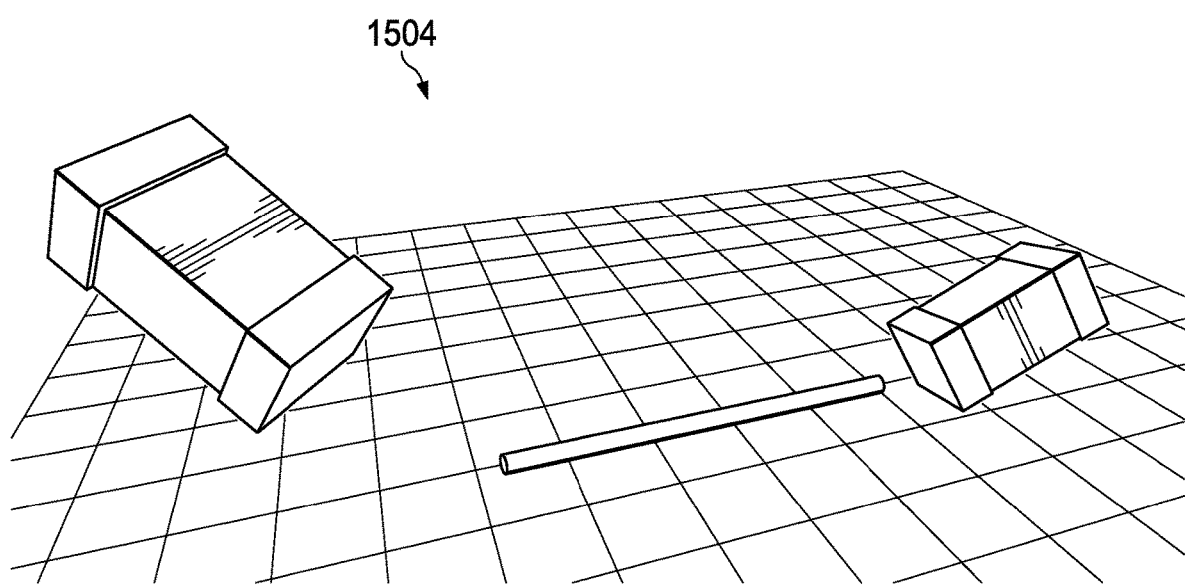
Figure 15C:
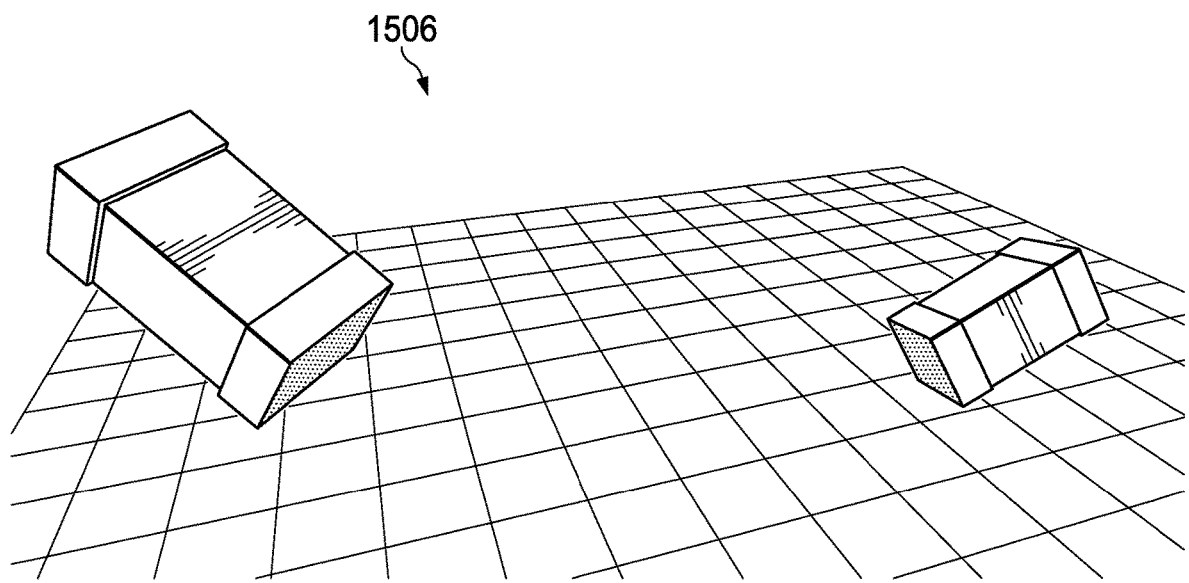
Figure 15D:
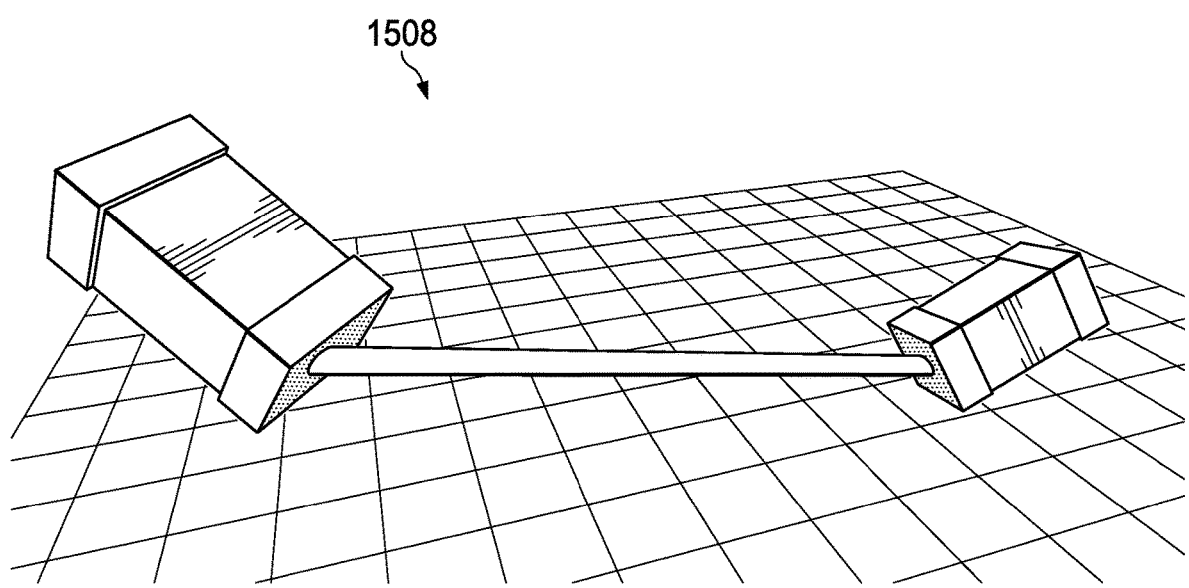

FIGS. 15A-D show a routing process in accordance with an illustrative embodiment. In FIG. 15A, at step 1502, no components are selected. At step 1504 in FIG. 15B, the interconnect is drawn free-floating when no components are selected. At step 1506 in FIG. 15C, the faces of two different components are selected. At step 1508 in FIG. 15D, the interconnect is drawn connecting the two selected faces.

Figure 16:
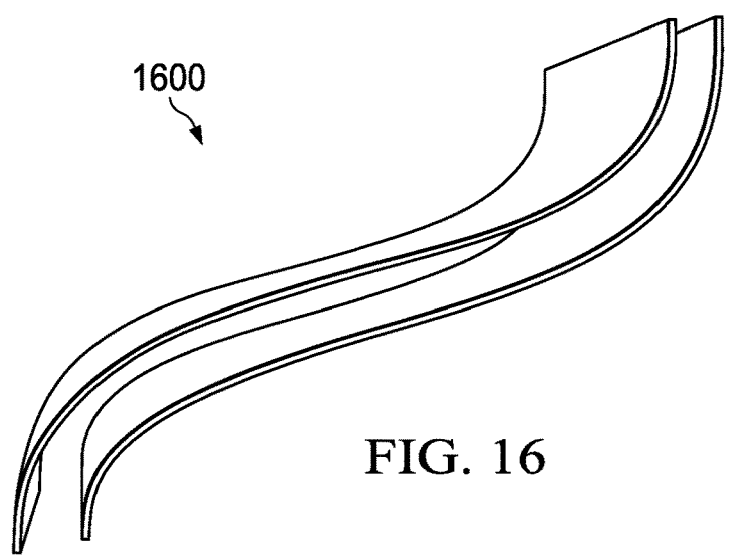
FIG. 16 is a rendered model of a parallel-plate transmission line in accordance with an illustrative embodiment.

FIG. 16 is a diagram 1600 showing a rendered model of a parallel-plate transmission line in accordance with an illustrative embodiment. A snapshot of the tool's user interface is provided in FIG. 7.

As with traditional circuit design and layout, in an embodiment, the circuit must be designed in schematic form and possibly even simulated to ensure proper functionality. Given the schematic, a netlist is generated describing the interconnects and their corresponding connections to the circuit elements. This same information is needed for both 2D and 3D circuit layout designs. A netlist and the component geometries are imported into our 3D CAD software where the physical layout of the circuit is performed. The schematic diagram for a 3D 555 timer circuit is given in FIGS. 8 and 9 along with the CAD model of the designed 3D circuit.

The schematic capture tool used in this project was the freeware version of DipTrace. DipTrace was selected for its schematic capture tool, its ability to export netlists for popular layout software as well as netlists for SPICE simulations, and its extensive 3D component library. Each component comes with its own STL model. These models include common standard integrated circuit (IC) packages as well as specialized components from different manufacturers. This library of parts was a tremendous benefit to this research.

For the CAD environment for layout and routing, our tools were programmed into the open-source graphics design software Blender as an add-on. Blender utilizes surface meshes for drawing and manipulating 3D objects and features a Python console and text editor to write scripts and add-ons. The 3D design tool was created by developing add-ons that import information from DipTrace, perform placement of parts, route interconnects, and export the 3D design.

In order to have easy access to each component while working within Blender, an add-on was created that imports and names individual components. The add-on allows the user to search through the list of components and select those needed for the design. The add-on also allows the user to import components directly from a netlist created by DipTrace. The tool is able to read the netlist and to recognize the names of each component's STL model and the nets connecting them. Each STL file is then imported separately so the corresponding components can be placed and oriented individually during the layout process. After all the components have been imported, the tool automatically names them according to the netlist so that each component is a direct representation of the original schematic.

The components are then placed by the user at any position and in any orientation, analogous to layout process of an ordinary 2D PCB layout software. Blender allows easy manipulation of the position (x, y, and z) and orientation ($\square$ and $\square$) of each component. This lets the user minimize the distance between components, minimize trace lengths, and form the circuit into any shape. In FIG. 10, described above, the 3D arranged components of the 555 circuit can be seen.

Another add-on was created to perform the routing process in 3D. The add-on functions in two ways: (1) a signal trace can be added as a free-floating connection to be routed manually, or (2) a signal trace can be placed semi-automatically between two selected components. There are also two choices of interconnects: (1) a DC line and (2) a high-frequency parallel plate transmission line (PPTL). Much of this add-on takes Blender's already-established functions and abilities and packages them into an interconnect router.

When creating an interconnect, the router generates a Nurbs curve (called a "path") via Blender's own modeler. The interconnect's body is then drawn along the path in a cylindrical shape using Blender's beveling function, where the thickness of the interconnect can be adjusted.

FIGS. 11 and 12 show the step-by-step process of how an interconnect is generated in accordance with an illustrative embodiment. The position and orientation of the interconnect itself is controllable via control points. Manipulation of these points allows the interconnect to bend and twist in any desired direction following a spline curvature. In FIGS. 13A-13B, an interconnect is shown drawn between two selected components along with its control points in accordance with an illustrative embodiment.

FIG. 14 depicts a computer render of the circuit with both components and signal traces in accordance with an illustrative embodiment.

The tool defaults to generating a free-floating interconnect when no electronic components are selected. However, the semi-automatic feature of the router allows for faster interconnect manipulation by placing an interconnect between any two desired components. In an embodiment, to do this, the user must first manually select the mesh faces of two different component terminals. The tool then draws a straight interconnect between the two selected sets of faces. The user then only needs to move the control points to the desired curvature, eliminating the step of moving the entire interconnect to the desired location.

FIGS. 15A-15D, described above, show an interconnect being drawn these two ways in accordance with an illustrative embodiment.

The interconnect router also has capabilities for generating a high-frequency differential transmission line. The only design implemented so far is a parallel-plate transmission line (PPTL). The PPTL was chosen due to its ability to confine fields and it was easier to manufacture in a 3D setting compared to coaxial lines.

FIG. 16, described above, shows a rendered model of a 3D PPTL in accordance with an illustrative embodiment. Because 3D RF circuits are still in its infancy stage, more research will be done in the future concerning this topic.

In an embodiment, the hybrid 3D printing process requires separate STL files for the metal interconnects and for the dielectric. In addition, in an embodiment, the meshes must be healthy and manifold or problems can arise in the manufacturing process. Blender has a built-in 3D Printing Toolbox that heals and exports an STL file for a given mesh. Simple Boolean operations were used to join interconnects into a single object as well as to subtract components and traces from the dielectric. We used the built-in features of the 3D Printing Toolbox to ensure the resulting meshes were manifold and ready to be exported.

The process chosen for manufacturing the device is similar to a dual-FDM process. Essentially, both plastic and ink tool paths are first generated as a dual-FDM process. The FDM tool path representing the metal is then later converted into a micro-dispensing process. This allows both plastic and paste to be printed in the same layer as the device is being printed. This method was implemented due to it being the most straightforward solution and because it generalizes the process as much as possible. Other printing processes might have worked favorably, such as printing the plastic with cavities and dispensing paste inside the cavities in a completely separate step. However, it was decided against this because there is no apparent way to distinguish when these separate processes would begin and end, or how many of them there would be due to the unique nature of the interconnects among different devices. Our simple approach ensured that any and all interconnects, regardless of orientation and component placement, were properly manufactured in a single process. Additionally, it was easier to monitor the print layer-by-layer when both paste and plastic were being deposited at the same time.

To manufacture the 3D circuit, a Tabletop nScrypt 3Dn hybrid 3D printer was used. This printer is capable of depositing filaments using FDM and conductive pastes using micro-dispensing. It is equipped with the second-generation SmartPump™ 100 system that was used to micro-dispense DuPont CB028 silver paste. This tool can control volume down to 100 pL, with a maximum resolution of 0.1 μm. It is capable of producing metal features as small as 20 μm×20 μm×25 μm. Acrylonitrile-butadiene-styrene (ABS) plastic for the substrate was deposited using nScrypt's nFD™ tool, which is capable of producing 125 μm wide by 50 μm tall lines that were suitable for this circuit. The hybrid printer is driven by Aerotech® A3200 Motion Composer Suite and uses ".pgm" files instead of regular g-code.

Current slicing software can utilize multiple extruders for the same type of material, usually some type of plastic. However, little research has been done with hybrid slicing where multiple extruders are operating by different g-code commands and operating using different physics. Due to the limitations of current slicing software, a custom software was written to be able to implement the slicing procedure for hybrid 3D printing.

The file processing starts by creating the g-code for two FDM materials and their respective tool paths using Slic3r and Repetier-Host. These are imported into our own custom software to remove the physics and commands of FDM and insert the physics and commands of micro-dispensing for one of the extruders. The software is a MATLAB script that converts the g-code file into a pgm file. The pgm file is capable of performing both FDM and micro-dispensing simultaneously. This whole process takes three steps: (1) generate g-code for an ordinary dual filament print, (2) convert physics from FDM to micro-dispensing for one of the extruders, and (3) compile the g-code into Aerotech® A3200 Motion Composer Suite pgm file with instructions for both nFD™ and the SmartPump™. To demonstrate our integrated design and manufacturing process, we fabricated a simple blinking LED circuit using a 555 timer and surface-mount components. A similar device was done in with through-hole components. We chose this simple circuit and components to show that our tool is capable of: (1) printing multiple meandering interconnects in 3D, (2) printing meandering interconnects in close proximity to each other with no open or short circuits, (3) printing the circuit into any arbitrary shape, (4) and successfully attaching components to traces, all in a 3D setting. The design is easily modified to place the components and traces in any other position or orientation.

In an illustrative embodiment, tor this project, we deposited dielectric using nScrypt's nFD™ pump set to produce 125 μm line widths out of 1.75 mm filament. The silver paste was dispensed in 125 μm width and 50 μm tall lines. For this demonstration, there was no need to adjust the extrusion multiplier beyond 1%. The 555 circuit contains six nets and six components. The following electronic components were used: one NE555DR integrated circuit, one 100 kΩ resistor, one 51 kΩ resistor, one 1 kΩ resistor, one 1 μF capacitor, and an APD3224SURCK-F01 red LED. The SMD packages were standard 1210 packages. The part dimensions were 13.36 mm×14.89 mm×8.88 mm. The interconnects were 0.3 mm in diameter. These dimensions were chosen to print a small device with printer head diameters of 125/175 μm. The total print time was 4 hours and 15 minutes.

Figure 17:
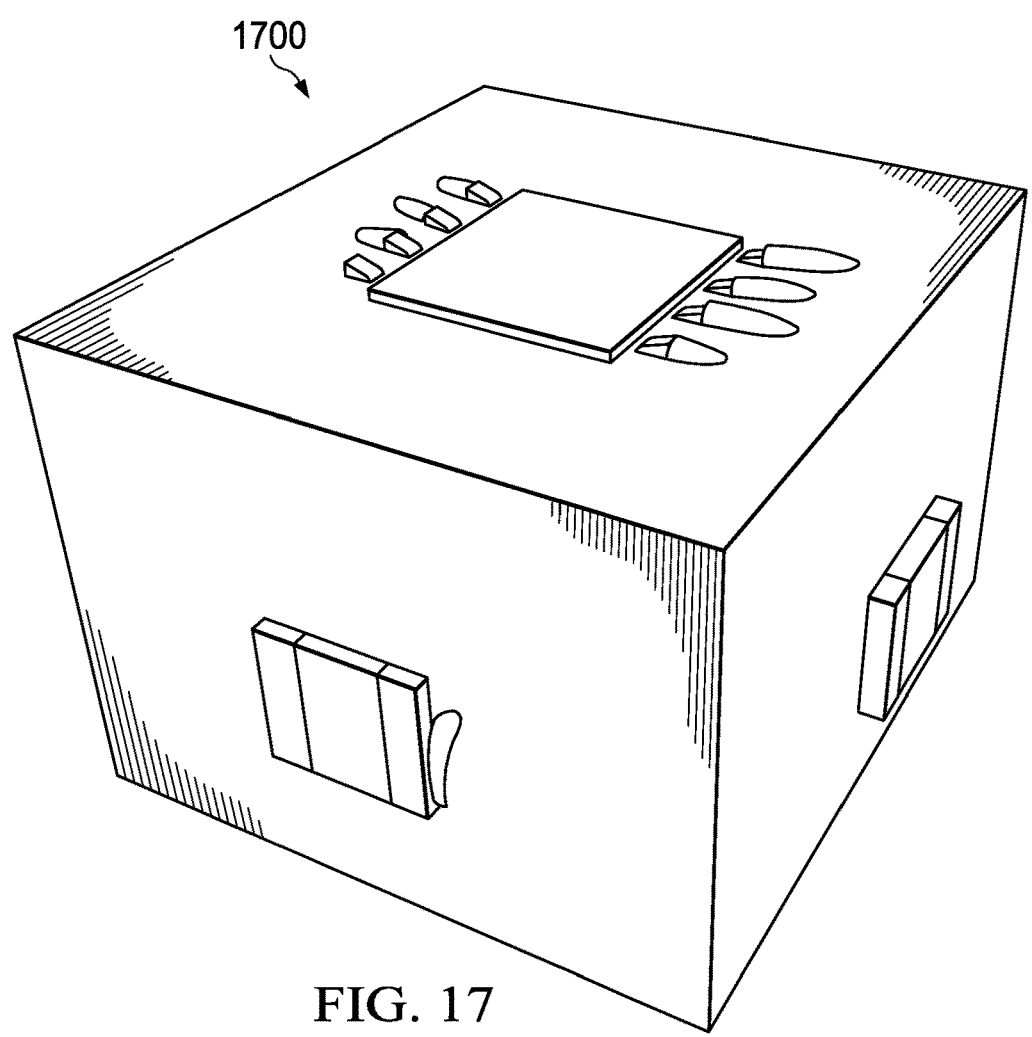
FIG. 17 shows a 3D printed 3D circuit designed and manufactured in accordance with an illustrative embodiment.
Figure 18:
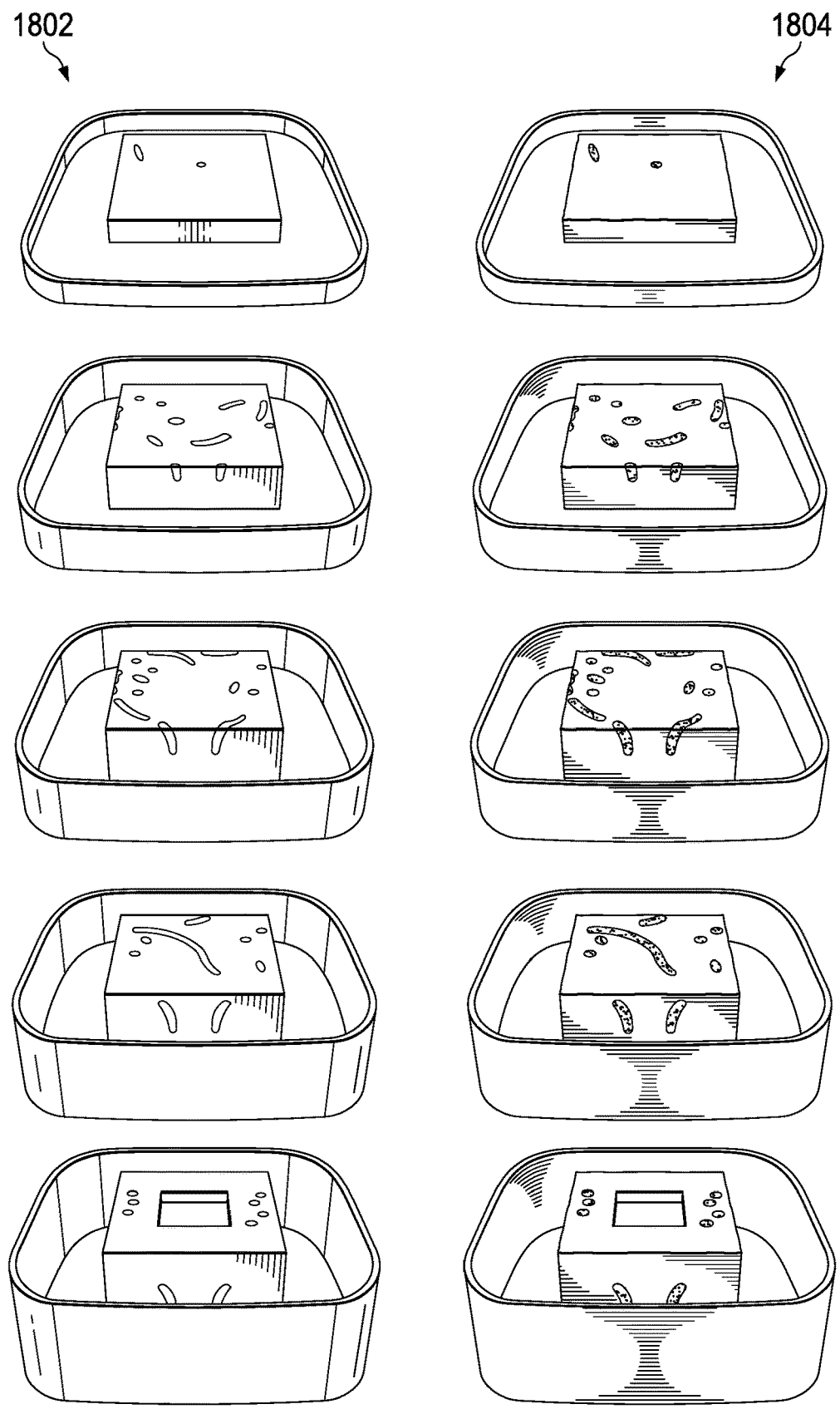
FIG. 18 shows a printing process of the 555 timer circuit in accordance with an illustrative embodiment.

A illustrative printed 3D circuit 1700 designed and manufactured in accordance with an illustrative embodiment is shown in FIG. 17. In an embodiment, proper fitting of our components required us to enlarge the voids for the components by 100 μm on each side. In an embodiment, due to the limitations of our equipment, post-process manual insertion of the components was required. The components were adhered using EPO-TEK H20E conductive epoxy. A comparison between the sliced model 1802 and device-under-print 1804 at several intermediate stages during the printing process is shown in FIG. 18 in accordance with an illustrative embodiment.

The design of the device was chosen to demonstrate the 3D capabilities of both the CAD tool and the hybrid printing process. Every trace in the circuit meanders in all directions giving the freedom to place the components in any desired position and orientation. Also, each component was shown to be able to be oriented along each axis, only constrained by what could be inserted manually.

Additionally, we encountered and overcame several challenges that arose from printing both ABS plastic and CB028 silver paste in a single process. These challenges were attributed to the inconsistency of dispensing CB028 and finding ideal SmartPump™ parameters. Consequently, design rules were devised to alleviate other minor issues and expedite the printing process. Other software and process limitations are further discussed here.

While the 3D Circuit Design Tool performed as needed, it is subject to some limitations, namely automatic design. Fully automatic placement and routing is desired, where component terminals are recognized and connected automatically and will conform to the shape of the plastic package. Additionally, in an embodiment, if the placement of the components needs to be changed after the interconnects have been drawn, the user must move both the components and the interconnects separately. Ideally, this would be fixed by locking the interconnect to its terminal where they would move together as one object.

Illustrative embodiments of this disclosure show that it is entirely possible to make a device with meandering lines and components in any position and orientation.

In an illustrative embodiment, some issues were observed when printing multiple stacked layers of CB028. Unlike the FDM process, the dispensing parameters appeared to change over time during the print. This appears to be due to the inhomogeneity of the paste. CB028 contains silver nanoparticle flakes as well as a curing agent.

In an illustrative embodiment, to address this, the CB028 had to be mixed and homogenized as thoroughly as possible before printing a device. We did this by first stirring the paste in its container. We then loaded the paste in 30 cc syringes with their corresponding caps and pistons. Whilst in the syringes, we centrifuged them at 4500 rpm for two minutes to separate any air bubbles infused in the paste. Once they were separated, we pushed out the air between the paste and piston until no air remained. This process was repeated as needed to further minimize the chance of infused air. Finally, we coupled a loaded 30 cc syringe with a 10 cc syringe and pushed the paste into the 10 cc syringe. We repeatedly pushed paste back-and-forth into each other to mix it further.

Ideally, the FDM g-code and pgm file for the SmartPump™ paths have a one-to-one correspondence. We found that this was not the case due to the different physics of the ABS and CB028. In an embodiment, we were required to change the SmartPump™ parameters before converting the FDM g-code to the pgm file. In an embodiment, the five parameters that needed special attention were the valve open position, the valve closed position, the valve pressure, the z-delta height between the nFD™ tip and SmartPump™ tip, and the SmartPump™ print speed.

The equivalent of FDM filament extrusion/retraction for the SmartPump™ is controlled by the valve open/closed positions and the valve pressure. It was found that dispensing CB028 paste is not as consistent as extruding filament. The valve positions changed each time after the pen tip was cleaned. Similarly, in an embodiment, less pressure needed to be applied. However, the flow rate settles after 15-30 minutes of printing. To account for this, we set our valve positions to give us the most consistent flow after the 15-30 minute time frame.

The z-delta height is the compensation for the difference in height between the nFD™ tip and the SmartPump™ tip. The actual difference between them was difficult to measure, but estimated to be 185 μm. The effect of the z-delta height is felt on the adhesion of paste to the print. A low z-delta (along with inadequate valve parameters mentioned before) will not dispense any paste onto the substrate as it is too far away. A high z-delta will cause the SmartPump™ tip to crash into the substrate.

The deciding factor for the success of print was the SmartPump™ print speed. Normally, when printing long traces of paste, the SmartPump™ print speed had to be high (50 mm/s) to dispense thin traces of paste. Due to the close proximity of the traces within the circuit and the multiple stacking of paste on top of paste, the speed was reduced to 15 mm/s. This allowed the paste to be properly dispensed in its locations and ensure proper conductivity when testing the final device.

In an illustrative embodiment, while performing the present research, several design rules were identified that aided in efficient slicing and reliable manufacturing. In terms of designing the device, the spacing between adjacent traces and components had to be at least four times the diameter of the SmartPump™ tip. In an embodiment, the traces are at least two times the diameter of the pen tip in order for the model to be sliced correctly.

During the slicing process, each layer contained either ABS, CB028, or both. Cavities were left in the ABS where the CB028 was to be dispensed. Naturally, rough grooves of ABS formed along the edges of each cavity as the printing direction changed. Printing paste in a rough cavity sometimes caused short and open circuits from paste either being hindered by or spilling over the grooves. To ensure a clean and smooth cavity, we ensured that perimeters of ABS were printed along the edges of each cavity.

Finally, in an illustrative embodiment, the addition of a skirt outside of the main device was included in the build. The skirt is a wall of dielectric surrounding the device during the printing process. Its first purpose is to prevent any drafts of air coming into contact with the lower parts of the device. This prevents bowing and helps maintain the structural integrity of the device. Its other purpose is to act as a priming object for the nFD™. During the printing process, the nFD™ picked up stray fragments of ABS and cured CB028. Printing the skirt allowed the nFD™ to effectively clean itself of any debris.

In this disclosure, two novel capabilities were combined to design and automate the manufacturing of true 3D circuits via hybrid 3D printing. A 3D circuit is one where components can be placed at any position and be in any orientation, and interconnects can meander smoothly throughout all three dimensions following spline paths. To demonstrate, a 555 timer circuit was manufactured with a hybrid 3D printing process combining fused-deposition modeling of ABS plastic and micro-dispensing of CB028 silver paste. This work shows that hybrid direct-write 3D printing is capable of manufacturing low-frequency electronics with comparable performance to their 2D and 2.5D counterparts. The implications of this are huge because it provides the capability to manufacture circuits sculpted into virtually any form factor.

Figure 19:
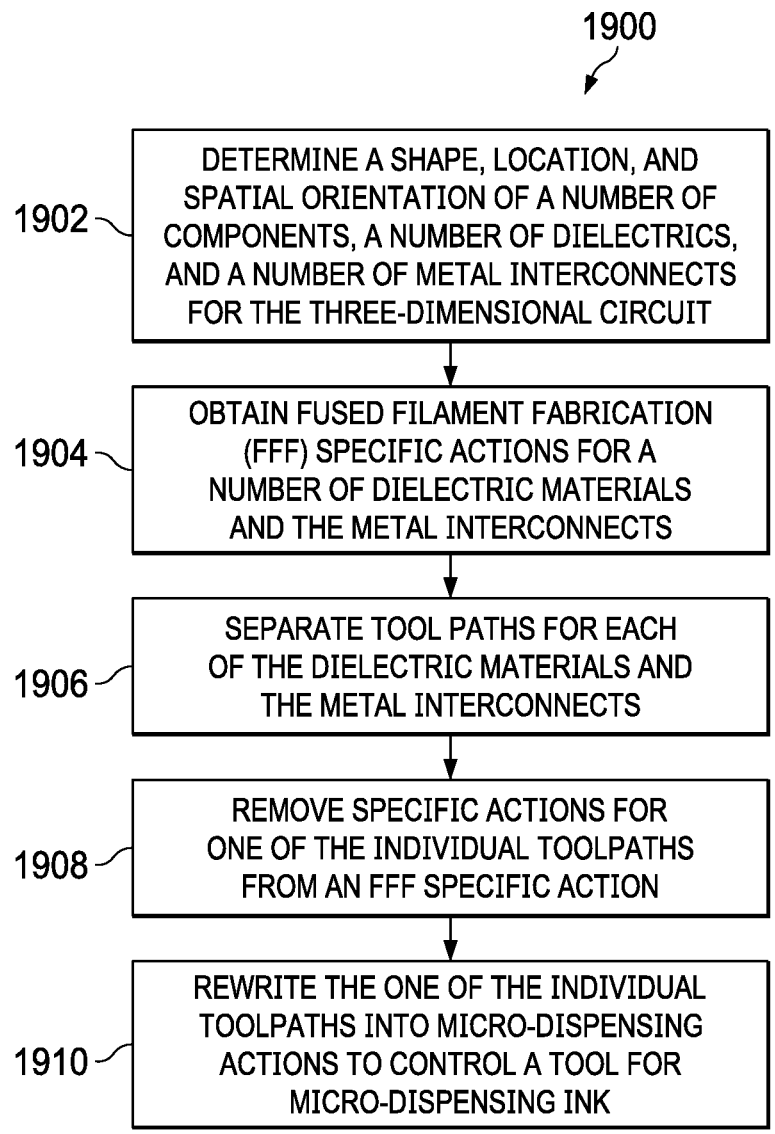
FIG. 19 is a flowchart of a method of fabricating a 3D circuit using an additive manufacturing process in accordance with an illustrative embodiment.

FIG. 19 is a flowchart of a method of fabricating a 3D circuit using an additive manufacturing process in accordance with an illustrative embodiment. The method 1900 begins by determining a shape, location, and spatial orientation of a number of components, a number of dielectrics, and a number of metal interconnects for the three dimensional circuit (step 1902). Next, the method obtains fused filament fabrication (FFF) specific actions for a number of dielectric materials and the metal interconnects (step 1904). Next, the method separates tool paths of the dielectric material and the metal interconnects into individual tool paths for each of the dielectric materials and the metal interconnects (step 1906). Next, the method removes specific actions for one of the individual toolpaths from an FFF specific action (step 1908). Next, the method rewrites the one of the individual toolpaths into micro-dispensing actions to control a tool for micro-dispensing ink (step 1910). In an illustrative embodiment, x, y, and z have equal freedom. In an illustrative embodiment, components can be placed at any position (x, y, and z) and be oriented at any angle (theta and phi). In an illustrative embodiment, interconnects meander smoothly throughout all three dimensions. In an illustrative embodiment, toolpaths are generated from multi-filament FFF. In an illustrative embodiment, one or more toolpaths for FFF is converted into a toolpath for another form of additive manufacturing (AM). In an illustrative embodiment, an other type of AM is microdispensing. In an illustrative embodiment, look ahead operations are performed to prevent crashing. In an illustrative embodiment, look ahead operations are performed to remove timing and physics and to insert new timing and physics for a new AM process.

In an illustrative embodiment, a method for fabricating a three-dimensional circuit by an additive manufacturing process includes obtaining code for fabricating a dielectric portion and the metal portion of the three-dimensional circuit. The method also includes separating the code into a first code and a second code, wherein the first code comprises code to control a fused filament fabrication (FFF) additive manufacturing process to fabricate the dielectric portion of the three-dimensional circuit, and wherein the second code comprises code to control a micro-dispensing ink process to fabricate the metal portion of the three-dimensional circuit, wherein the first and second code are interlaced such that the fabrication process switches back and forth between forming the dielectric and forming the metal interconnect.

Figure 20:
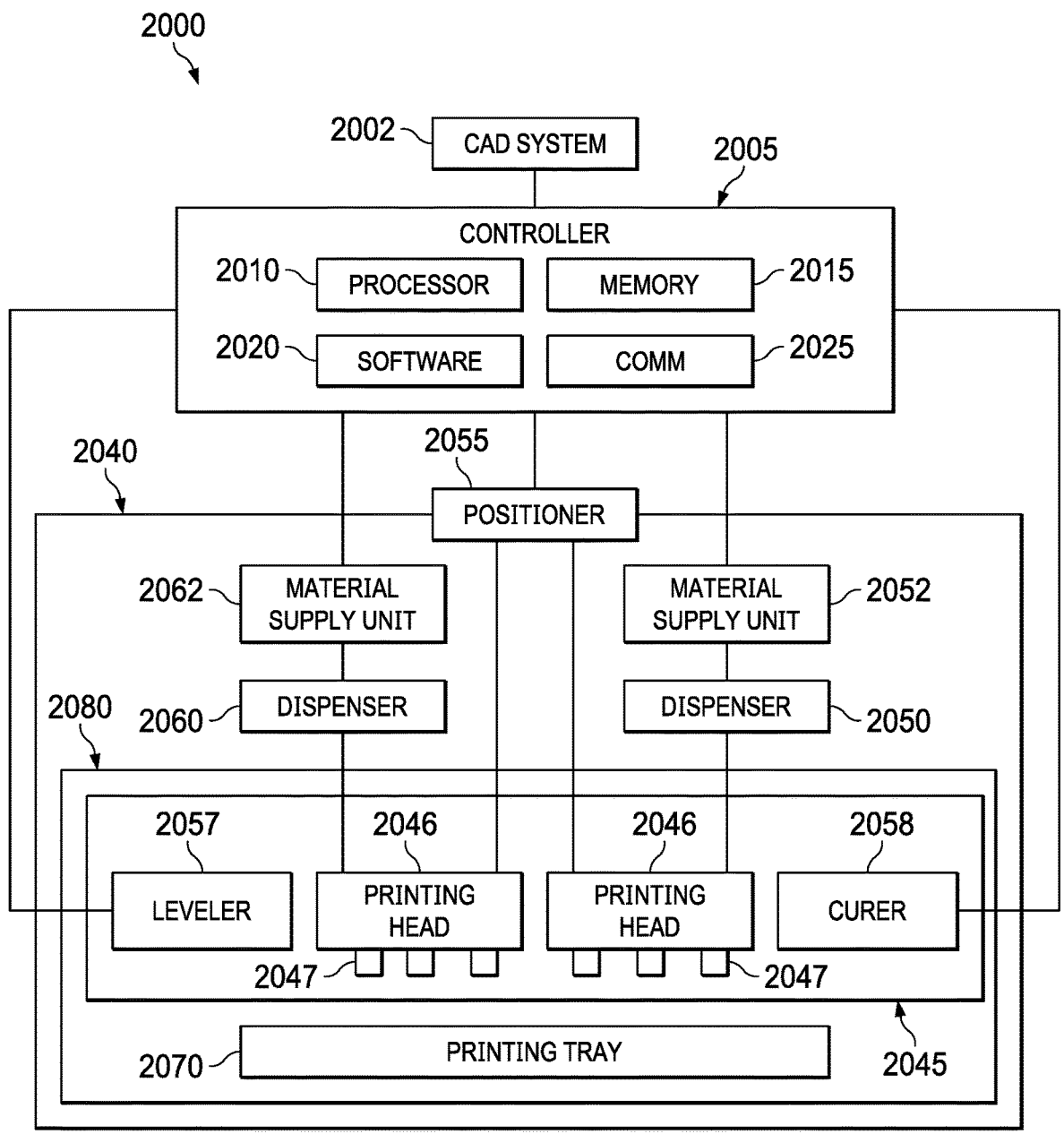
FIG. 20 is a block diagram of a 3D printer system depicted in accordance with an illustrative embodiment.

FIG. 20 is a block diagram of a 3D printer system 2000 depicted in accordance with an illustrative embodiment. 3D printer system 2000 is an example of an additive manufacturing machine. 3D printer system 2000 may implement the methods disclosed herein, such as, for example, method 1900 depicted in FIG. 19. 3D printer system 2000 may include, for example, a CAD system 2002 or other design module, controller 2005, and printing apparatus 2040.

Controller 2005, which may prepare the digital data that characterizes a 3-D object for printing, and control the operation of the printing apparatus, may include, for example, a processor 2010, a memory unit 2015, software code 2020, and a communications unit 2025. Other configurations may be used for a controller or control unit. Control functionality may be spread across units, and not all control functionality may be within system 2000. For example, a separate unit, such as a personal computer or workstation, or a processing unit within a supply source such as a cartridge may provide some control or data storage capability. Communications unit 2025 may, for example, enable transfer of data and instructions between controller 2005 and/or CAD system 2002, between controller 2005 and printing apparatus 2040, and/or between controller 2005 and other system elements. Controller 2005 may be suitably coupled and/or connected to various components of printing apparatus 2040.

Printing apparatus 2040 may include for example positioner(s) 2055, material dispenser(s) 2050, 2060, material supply unit(s) 2052, 2062, and printing sub-system 2080. Printing sub-system 2080 may include a printing box 2045, and a printing tray 2070. Printing box 2045 may include printing head(s) 2046, printing nozzle(s) 2047, leveler(s) 2057, curer(s) 2059, and other suitable components. Positioner 2055, or other suitable movement devices, may control the movement of printing head 2045. Leveler or leveling device 2057 may include, for example, a roller or blade or other suitable leveling mechanism. Printing head 2045 may be, for example, an ink jet head or other suitable printing head.

Controller 2005 may utilize Computer Object Data (COD) representing an object or a model, for example, CAD data in STL format. Controller 2005 may also utilize optimized data from optimizer 2001. Other data types or formats may be used. Controller 2005 may convert such data to instructions for the various units within 3D printer system 2000 to print a 3D object. Controller 2005 may be located inside printing apparatus 2040 or outside of printing apparatus 2040. Controller 2005 may be located outside of printing system 2000 and may communicate with printing system 2000, for example, over a wire and/or using wireless communications. In some embodiments, controller 2005 may include a CAD system or other suitable design system. In alternate embodiments, controller 2005 may be partially external to 3D printer system 2000. For example, an external control or processing unit (e.g., a personal computer, workstation, computing platform, or other processing device) may provide some or all of the printing system control capability.

In some embodiments, a printing file or other collection of print data may be prepared and/or provided and/or programmed, for example, by a computing platform connected to 3D printer system 2000. The printing file may be used to determine, for example, the order and configuration of deposition of building material via, for example, movement of and activation and/or non-activation of one or more nozzles 2047 of printing head 2045, according to the 3D object to be built.

Controller 2005 may be implemented using any suitable combination of hardware and/or software. In some embodiments, controller 2005 may include, for example, a processor 2010, a memory 2015, and software or operating instructions 2020. Processor 2010 may include conventional devices, such as a Central Processing Unit (CPU), a microprocessor, a "computer on a chip", a micro controller, etc. Memory 2015 may include conventional devices such as Random Access Memory (RAM), Read-Only Memory (ROM), or other storage devices, and may include mass storage, such as a CD-ROM or a hard disk. Controller 2005 may be included within, or may include, a computing device such as a personal computer, a desktop computer, a mobile computer, a laptop computer, a server computer, or workstation (and thus part or all of the functionality of controller 2005 may be external to 3D printer system 2000). Controller 2005 may be of other configurations, and may include other suitable components.

According to some embodiments of the present invention, material supply unit(s) 2052, 2062 may supply building materials to printing apparatus 2040. Building materials may include any suitable kind of object building material, such as, for example, photopolymers, wax, powders, plastics, metals, and may include modeling material, support material and/or release material, or any alternative material types or combinations of material types. In some embodiments of the present invention, the building materials used for construction of the 3D object are in a liquid form. In an exemplary embodiment, the modeling and/or support materials used are photopolymers that may contain material curable by electromagnetic radiation and/or electron beams etc. The materials may come in different forms, textures, colors, etc. Other suitable materials or combinations of materials may be used.

Figure 21:
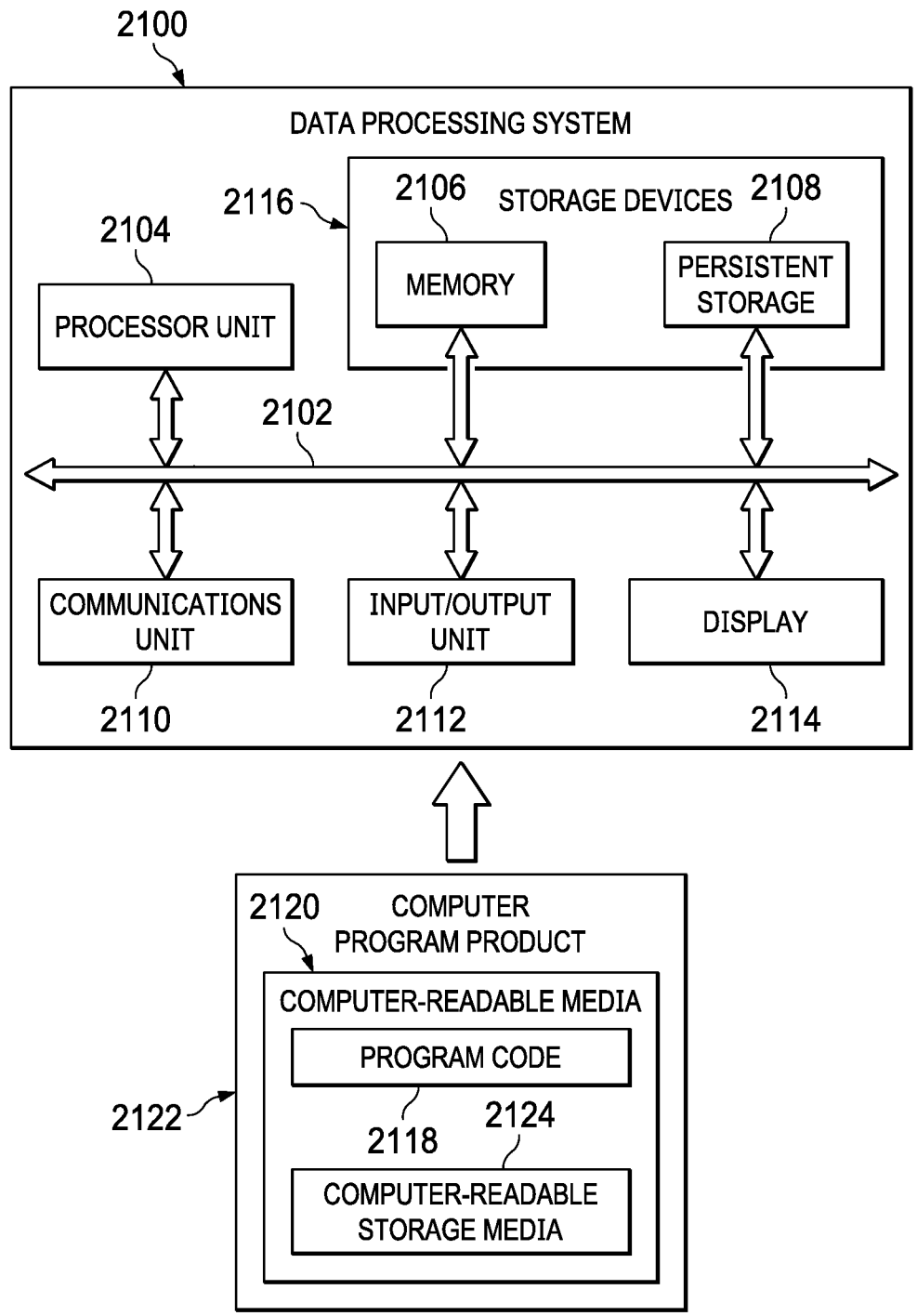
FIG. 21 is a block diagram of a data processing system depicted in accordance with an illustrative embodiment.

Turning now to FIG. 21, a block diagram of a data processing system is depicted in accordance with an illustrative embodiment. Data processing system 2100 may be used to implement method 1900 depicted in FIG. 19 and to control 3d printer system 2000 depicted in FIG. 20. Data processing system 2100 may also be used to implement optimizer 2001, CAD 0102, and/or controller 2005. In an embodiment, data processing system 2100 is a massively parallel processing (MPP) data processor with multiple processors.

In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 may take the form of a bus system.

Processor unit 2104 serves to execute instructions for software that may be loaded into memory 2106. Processor unit 2104 may be a number of processors, a multi-processor core, or some other type of processor, depending on the particular implementation.

Memory 2106 and persistent storage 2108 are examples of storage devices 2116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2116 may also be referred to as computer-readable storage devices in these illustrative examples. Memory 2106, in these examples, may be, for example, a random-access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a solid-state drive (SSD), a flash memory, a rewritable optical disk, a rewritable magnetic tape, or some combination of the above. The media used by persistent storage 2108 also may be removable. For example, a removable hard drive may be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that may be connected to data processing system 2100. For example, input/output unit 2112 may provide a connection for user input through at least one of a keyboard, a mouse, or some other suitable input device. Further, input/output unit 2112 may send output to a printer. Display 2114 provides a mechanism to display information to a user.

Instructions for at least one of the operating system, applications, or programs may be located in storage devices 2116, which are in communication with processor unit 2104 through communications framework 2102. The processes of the different embodiments may be performed by processor unit 2104 using computer-implemented instructions, which may be located in a memory, such as memory 2106.

These instructions are referred to as program code, computer usable program code, or computer-readable program code that may be read and executed by a processor in processor unit 2104. The program code in the different embodiments may be embodied on different physical or computer-readable storage media, such as memory 2106 or persistent storage 2108.

Program code 2118 is located in a functional form on computer-readable media 2120 that is selectively removable and may be loaded onto or transferred to data processing system 2100 for execution by processor unit 2104. Program code 2118 and computer-readable media 2120 form computer program product 2122 in these illustrative examples. In the illustrative example, computer-readable media 2120 is computer-readable storage media 2124.

In these illustrative examples, computer-readable storage media 2124 is a physical or tangible storage device used to store program code 2118 rather than a medium that propagates or transmits program code 2118.

Alternatively, program code 2118 may be transferred to data processing system 2100 using a computer-readable signal media. The computer-readable signal media may be, for example, a propagated data signal containing program code 2118. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2100 are not meant to provide architectural limitations to the manner in which different embodiments may be implemented. The different illustrative embodiments may be implemented in a data processing system including components in addition to or in place of those illustrated for data processing system 2100. Other components shown in FIG. 21 can be varied from the illustrative examples shown. The different embodiments may be implemented using any hardware device or system capable of running program code 2118.

The following references are incorporated herein by reference:

[1] J. Skoukup, "Circuit Layout," *Proc. IEEE.*, vol. 69, no. 11, pp. 1281-1304, October 1981, DOI: 10.1109/PROC.1981.12167

[2] U. Robles, A. Kudzal, R. C. Rumpf. "Automated Hybrid 3D Printing of 3D Meandering Interconnects" IEEE APS Journal. Under Review.

[3] K. H. Church, H. Tsang, R. Rodriguez, P. Deffenbaugh, R. Rumpf. 2013, February Printed Circuit Structures, the Evolution of Printed Circuit Boards. Presented at IPC APEX EXPO. [Online]. Available: http://www.circuitinsight.com/pdf/printed_circuit_structures_ipc.pdf

[4] F. Schindler-Saefkow, O. Wittler, D. May, B. Michel. "Thermal Management in a 3D-PCB-Package with Water Cooling," in *Electronics Systemintegration Technology Conf.*, Dresden, Germany, 2006, pp. 107-110.

[5] Y. Sterman, E. D. Demaine, N. Oxman. "PCB Origami: A Material-Based Design Approach to Computer-Aided Foldable Electronic Devices," *J. Mech. Des.*, vol. 135, no. 11, pp. 114502-114502-4, October 2013, DOI: 10.1115/1.4025370.

[6] S. Agarwala, J. M. Lee, W. L. Ng, M. Layani, W. Y. Yeong, S. Magdassi. "A novel 3D bioprinted flexible and biocompatible hydrogel bioelectronics platform," *Els.*, vol. 102, pp. 365-371, November 2017, DOI: 10.1016/J.BIOS.2017.11.039.

[7] A. D. Valentine, T. A. Busbee, J. W. Boley, J. R. Raney, A. Chortos, A. Kotikian, J. D. Berrigan, M. F. Durstock, J. A. Lewis. "Hybrid 3D Printing of Soft Electronics," *Adv. Mat.*, vol. 29, no. 40, p. 1703817, June 2017, DOI: 10.1002/ADMA.201703817.

[8] R. C. Rumpf, C. R. Garcia, H. H. Tsang, J. E. Padilla, M. D. Irwin. "Electromagnetic Isolation of A Microstrip By Embedding In A Spatially Variant Anisotropic Metamaterial," *Prog. Electromagnetic Res.*, vol. 142, pp. 243-260, September 2013.

[9] H. H. H. Maalderink, F. B. J. Bruning, M. M. R. D. Schipper, John H. H. Van Der Werff, W. W. C. Germs, J. J. C. Remmers, E. R. Meinders. "3D Printed structural electronics: embedding and connecting electronic components into freeform electronics devices," *Plastics, Rubber and Composites*, vol. 47, no. 1, pp. 35-41, December 2017, DOI: 10.1080/14658011.2017.1418165.

[10] G. L. Goh, S. Agarwala, G. D. Goh, H. K. J. Tan, L. Zhao, T. K. Chuah, W. Y. Yeong. "Additively manufactured multi-material free-form structure with printed electronics," *Int. J. Adv. Manufacturing. Tech.*, vol. 94, no. 1-4, pp. 1309-1316, August 2017, DOI: 10.10.1007/S00170-017-09.72-Z.

[11] C. Bailey, E. Aguilera, D. Espalin, J. Motta, A. Fernandez, M. A. Perez, C. Dibiasio, D. Pryputniewicz, E. Macdonald, R. B. Wicker. "Augmenting Computer-Aided Design Software With Multi-Functional Capabilities to Automate Multi-Process Additive Manufacturing," *IEEE Acc.*, vol. 6, pp. 1985-1994, February 2018, DOI: 10.1109/ACCESS.2017.2781249.

[12] D. Periard, E. Malone, and H. Lipson. "Printing embedded circuits," in *Proc. Solid Freeform Fabrication Symp.*, 2007, pp. 503-512

[13] T. P. Ketterl, et al., "A 2.45 GHz Phased Array Antenna Unit Cell Fabricated Using 3-D Multi-Layer Direct Digital Manufacturing" IEEE Transactions on Microwave Theory and Techniques, vol. 63, no. 12, pp. 4382-4394, December 2015. doi: 10.1109/TMTT.2015.2496180

[14] nScrypt Specification Sheet "SmartPump™ 100 Specification Sheet". nScrypt Inc. Orlando, Fla. [Online] http://www.nscrypt.com

[15] nScrypt Specification Sheet "Table Top Printer Specification Sheet". nScrypt Inc. Orlando, Fla. [Online] http://www.nyscript.com

[16] H. Lipson and M. Kurman, Fabricated: The New World of 3D Printing. Hoboken, N.J., USA: Wiley, 2013.

[17] Leigh S J, Bradley R J, Purssell C P, Billson D R, Hutchins D A (2012) "A Simple, Low-Cost Conductive Composite Material for 3D Printing of Electronic Sensors." PLoS ONE 7(11)

[18] K. Church, E. MacDonald, P. Clark, R. Taylor, D. Paul, K. Stone, M. Wilhelm, F. Medina, J. Lyke, R. Wicker, "Printed electronic processes for flexible hybrid circuits and antennas," Flexible Electronics & Displays Conference and Exhibition, 2009, vol., no., pp.1, 7, 2-5 February 2009.

[19] David Espalin, Danny W. Muse, Eric MacDonald, Ryan B. Wicker. "3D Printing Multifunctionality: Structures with Electronics." The International Journal of Advanced Manufacturing Technology. May 2014, Volume 72, Issue 5, pp 963-978

[20] Gilbert T. Carranza, U. Robles, R. C. Rumpf, Cesar L. Valle, Jesus J. Gutierrez. "CAD Tool for ThreeDimensional Circuit Layout, Routing, and Manufacturing" IEEE APS Journal. Under Review.

[21] Blender. Computer software. <http://www.blender.org>. Vers. V2.79b. Blender Foundation, n.d. Web

[22] Ranellucci, et al., Slic3r. Computer Software. "G-code Generator for 3D Printers." Vers 1.2.9. <http://www.slic3r.org. Web

[23] Hot-World GmbH & Co. K G. Repetier-Host. "3D printing application".Knickelsdorf4247877Willich, Germany

[24] Sung-Hoon Ahn, Michael Montero, Dan Odell, Shad Roundy, Paul K. Wright, (2002) "Anisotropic material properties of fused deposition modeling ABS", Rapid Prototyping Journal, Vol. 8 Issue: 4, pp.248-25'7, https://doi.org/10.1108/13552540210441166

[25] nScrypt Specification Sheet "Table Top Printer Specification Sheet". nScrypt Inc. Orlando, Fla. [Online] http://www.nscrypt.com

[26] nScrypt Specification Sheet "SmartPump™ 100 Specification Sheet". nScrypt Inc. Orlando, Fla. [Online] http://www.nscrypt.com

[27] A3200 Motion Composer Suite. 1994-2018 Aerotech Inc. Web https://www.aerotech.com

[28] nScrypt Specification Sheet "nFD™ Specification Sheet". nScrypt Inc. Orlando, Fla. [Online] http://www.nscrypt.com

[29] T. P. Ketterl, et al., "A 2.45 GHz Phased Array Antenna Unit Cell Fabricated Using 3-D Multi-Layer Direct Digital Manufacturing" IEEE Transactions on Microwave Theory and Techniques, vol. 63, no. 12, pp. 4382-4394, December 2015. doi: 10.1109/TMTT.2015.2496180

[30] Technical Data Sheet "DuPont CB028 Silver Conductor" 19: 1345. doi:10.1007/BF02662823. [Online] http://www.mcm.dupont.com

[31] P. Deffenbaugh, "3D Printed Electromagnetic Transmission and Electronic Structures Fabricated on a Single Platform Using Advanced Process Integration Techniques," Ph.D. Dissertation, University of Texas at El Paso, August 2014.

It should be understood that embodiments discussed herein are not limited to the particular features and processing steps shown. The descriptions provided herein are not intended to encompass all of the steps that may be used. Certain steps that are commonly used are purposefully not described herein for economy of description.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for fabricating a three-dimensional circuit by an additive manufacturing process comprising:
    determining a shape, location, and spatial orientation of a number of components, a number of dielectrics, and a number of metal interconnects for the three dimensional circuit;
    obtaining fused filament fabrication (FFF) specific actions for the number of dielectrics and the number of metal interconnects;
    separating tool paths of the number of dielectrics and the number of metal interconnects into individual tool paths for each of the number of dielectrics and the number of metal interconnects;
    removing specific actions for one of the individual toolpaths from an FFF specific action;
    performing a look ahead function to identify ramp-down for a filament path corresponding to the micro-dispenser; and
    rewriting the one of the individual toolpaths into microdispensing actions to control a tool for micro-dispensing ink.

2. The method of claim 1, further comprising:
    performing a look ahead function to identify stop-start printing on a same layer to raise a height of a pump during non-printing movements in order to avoid collision with previously dispensed structures.

3. The method of claim 1, wherein x, y, and z have equal freedom.

4. The method of claim 1, wherein components can be placed at any position (x, y, and z) and be oriented at any angle (theta and phi).

5. The method of claim 1, wherein the number of metal interconnects meander smoothly throughout all three dimensions.

6. The method of claim 1, wherein the tool paths of the number of dielectrics and the number of metal interconnects are generated from multi-filament FFF.

7. The method of claim 1, wherein one or more toolpaths tool paths for FFF is converted into a tool path for an other form of additive manufacturing (AM).

8. The method of claim 7, wherein the other form of AM is microdispensing.

9. The method of claim 1, wherein look ahead operations are performed to prevent crashing.

10. The method of claim 1, wherein look ahead operations are performed to remove timing and physics and to insert new timing and physics for a new AM process.

11. A method for fabricating a three-dimensional circuit by an additive manufacturing process comprising:
    obtaining code for a fabrication process of a dielectric portion and a metal portion of the three-dimensional circuit; and
    separating the code into a first code and a second code while performing a look ahead function to identify ramp-down for a filament path corresponding to a micro-dispenser, wherein the first code comprises code to control a fused filament fabrication (FFF) additive manufacturing process to fabricate the dielectric portion of the three-dimensional circuit, and wherein the second code comprises code to control a micro-dispensing ink process to fabricate the metal portion of the three-dimensional circuit, wherein the first code and the second code are interlaced such that the fabrication process switches back and forth between forming the dielectric portion and forming the metal portion.

12. A computer system for fabricating a three-dimensional circuit by an additive manufacturing process, the computer system comprising:
a bus system;
a storage device connected to the bus system, wherein the storage device stores program instructions; and
a processor connected to the bus system, wherein the processor executes the program instructions to:
determine a shape, location, and spatial orientation of a number of components, a number of dielectrics, and of a number of metal interconnects for the three dimensional circuit;
obtain fused filament fabrication (FFF) specific actions for the number of dielectrics and the number of metal interconnects;
separate tool paths of the number of dielectrics and the number of metal interconnects into individual tool paths for each of the number of dielectrics and the number of metal interconnects;
remove specific actions for one of the individual toolpaths from an FFF specific action;
perform a look ahead function to identify ramp-down for a filament path corresponding to the micro-dispenser; and
rewrite the one of the individual toolpaths into micro-dispensing actions to control a tool for micro-dispensing ink.

13. The computer system of claim 12, wherein the processor further executes the program instructions to:
perform a look ahead function to identify stop-start printing on a same layer to raise a height of a pump during non-printing movements in order to avoid collision with previously dispensed structures.

14. The computer system of claim 12, wherein x, y, and z have equal freedom.

15. The computer system of claim 12, wherein components can be placed at any position (x, y, and z) and be oriented at any angle (theta and phi).

16. The computer system of claim 12, wherein the number of metal interconnects meander smoothly throughout all three dimensions.

17. The computer system of claim 12, wherein tool paths of the number of dielectrics and the number of metal interconnects are generated from multi-filament FFF.

18. The computer system of claim 12, wherein one or more toolpaths tool paths for FFF is converted into a tool path for an other form of additive manufacturing (AM).

19. The method of claim 12, wherein look ahead operations are performed to prevent crashing.

20. The method of claim 12, wherein look ahead operations are performed to remove timing and physics and to insert new timing and physics for a new AM process.

* * * * *